United States Patent
Curtis

(10) Patent No.: US 10,192,233 B2
(45) Date of Patent: Jan. 29, 2019

(54) SYSTEM AND METHOD FOR MEDIA TRADE-IN

(71) Applicant: James Robert Curtis, Carrollton, TX (US)

(72) Inventor: James Robert Curtis, Carrollton, TX (US)

(73) Assignee: Arch Holdings, LP, Carrollton, TX (US)

( * ) Notice: Subject to any disclaimer, the term of this patent is extended or adjusted under 35 U.S.C. 154(b) by 0 days.

(21) Appl. No.: 15/439,762

(22) Filed: Feb. 22, 2017

(65) Prior Publication Data

US 2018/0240144 A1    Aug. 23, 2018

(51) Int. Cl.
*G06Q 30/02*    (2012.01)
*G07F 11/54*    (2006.01)

(52) U.S. Cl.
CPC ..... *G06Q 30/0237* (2013.01); *G06Q 30/0206* (2013.01); *G06Q 30/0215* (2013.01); *G06Q 30/0231* (2013.01); *G07F 11/54* (2013.01)

(58) Field of Classification Search
CPC ................................................ G06Q 30/0237
USPC ...... 235/380, 379, 375, 38; 705/5, 23, 14.13
See application file for complete search history.

(56) References Cited

U.S. PATENT DOCUMENTS

| | | |
|---|---|---|
| 4,910,675 A | 3/1990 | Burns et al. |
| 5,046,305 A | 9/1991 | Skubic et al. |
| 5,206,814 A | 4/1993 | Cahlander et al. |
| 5,210,729 A | 5/1993 | Schmidt et al. |
| 5,247,407 A | 9/1993 | Schimidt |
| 5,265,966 A | 11/1993 | Schmidt |
| 5,351,466 A | 10/1994 | Lee |
| 5,415,519 A | 5/1995 | Lee et al. |
| 5,421,950 A | 6/1995 | Parrish |
| 5,542,768 A | 8/1996 | Rother et al. |
| 5,679,944 A | 10/1997 | Cusey et al. |
| 5,734,629 A | 3/1998 | Lee et al. |
| 5,892,900 A | 4/1999 | Ginter et al. |

(Continued)

FOREIGN PATENT DOCUMENTS

| | | |
|---|---|---|
| CN | 101207782 | 6/2008 |
| JP | 2008140215 | 6/2008 |
| WO | 2012100239 A2 | 7/2012 |

OTHER PUBLICATIONS

Semshred, Information Destruction Resource Guide, 12 pages, Westborough, MA.

(Continued)

*Primary Examiner* — Allyson Trail
(74) *Attorney, Agent, or Firm* — David W. Carstens; Stephen Y. Liu; Carstens & Cahoon, LLP

(57) ABSTRACT

A system and method for media trade-in exchange. The apparatus comprises a kiosk that allows a user to provide a plurality of media items to the kiosk for verification and analysis and then calculate the exchange redemption value. The exchange redemption value is calculated based on the physical damage of a media item, the included media item packaging, the included media item documentation, and the authenticity of the media item. The user may then choose to receive the redemption value in a plurality of options comprised of cash, debit, store credit, reward points, gift card, eCodes, or may alternatively, decline to accept the redemption value offer and have the media item returned to them.

30 Claims, 18 Drawing Sheets

(56) References Cited

U.S. PATENT DOCUMENTS

| | | | |
|---|---|---|---|
| 5,914,918 A | 6/1999 | Lee et al. | |
| 5,946,216 A | 8/1999 | Hollerich | |
| 6,041,703 A | 3/2000 | Salisbury et al. | |
| 6,092,105 A | 7/2000 | Goldman | |
| 6,141,298 A | 10/2000 | Miller | |
| 6,220,640 B1 | 4/2001 | Jensen et al. | |
| 6,226,618 B1 | 5/2001 | Downs et al. | |
| 6,321,649 B1 | 11/2001 | Vangen et al. | |
| 6,532,201 B1 | 3/2003 | Hogan | |
| 6,655,580 B1 | 12/2003 | Ergo et al. | |
| 6,748,539 B1 | 6/2004 | Lotspiech | |
| 6,760,053 B2 | 7/2004 | Rother | |
| 6,778,201 B2 | 8/2004 | Rother | |
| 6,827,509 B2 | 12/2004 | Suden et al. | |
| 6,848,113 B2 | 1/2005 | Klein | |
| 6,957,746 B2 | 10/2005 | Martin et al. | |
| 7,014,108 B2 | 3/2006 | Sorenson et al. | |
| 7,092,320 B1 | 8/2006 | Lee et al. | |
| 7,108,171 B1 | 9/2006 | Ergo et al. | |
| 7,127,725 B2 | 10/2006 | Lee | |
| 7,305,684 B2 | 12/2007 | Klein | |
| 7,311,367 B2 | 12/2007 | Salisbury et al. | |
| 7,331,521 B2 | 2/2008 | Sorenson et al. | |
| 7,448,051 B2 | 11/2008 | Nelson et al. | |
| 7,494,048 B2 | 2/2009 | Gusler et al. | |
| 7,530,083 B2 | 5/2009 | Benedikt et al. | |
| 7,536,324 B2 | 5/2009 | Perkowski | |
| 7,748,619 B2 | 7/2010 | Martin et al. | |
| 7,774,233 B2 | 8/2010 | Barber et al. | |
| 7,815,071 B2 | 10/2010 | Martin et al. | |
| 7,860,606 B2 | 12/2010 | Rudy | |
| 7,865,432 B2 | 1/2011 | Doran et al. | |
| 8,024,272 B2 | 9/2011 | Doran et al. | |
| 8,033,375 B2 | 10/2011 | Doran et al. | |
| 8,038,059 B2 | 10/2011 | Martin et al. | |
| 8,095,236 B2 | 1/2012 | Rudy et al. | |
| 8,103,586 B2 | 1/2012 | Doran et al. | |
| 8,162,383 B2 | 4/2012 | Curtis | |
| 8,229,851 B2 | 7/2012 | Doran et al. | |
| 8,332,313 B2 | 12/2012 | Doran et al. | |
| 8,482,413 B2 | 7/2013 | Martin | |
| 8,550,294 B2 | 10/2013 | Martin | |
| 8,682,715 B1* | 3/2014 | Cedeno | G06Q 20/204 705/14.1 |
| 8,726,010 B2 | 5/2014 | Mathur et al. | |
| 8,760,296 B2 | 6/2014 | Martin | |
| 8,874,467 B2 | 10/2014 | Yahn et al. | |
| 8,935,532 B2 | 1/2015 | Mittal et al. | |
| 8,965,570 B2 | 2/2015 | Rudy | |
| 9,064,268 B2 | 6/2015 | Larrick et al. | |
| 9,227,800 B2 | 1/2016 | Martin | |
| 9,233,812 B2 | 1/2016 | Martin et al. | |
| 9,245,310 B2 | 1/2016 | Zhao et al. | |
| 9,290,338 B2 | 3/2016 | Martin et al. | |
| 2001/0029583 A1 | 10/2001 | Palatov et al. | |
| 2002/0035515 A1 | 3/2002 | Moreno | |
| 2002/0046122 A1* | 4/2002 | Barber | G06Q 10/087 705/17 |
| 2002/0095680 A1 | 7/2002 | Davidson | |
| 2003/0135465 A1 | 7/2003 | Lee et al. | |
| 2003/0177928 A1 | 9/2003 | Harris | |
| 2004/0034785 A1 | 2/2004 | Tai et al. | |
| 2004/0254940 A1 | 12/2004 | Brush | |
| 2005/0018216 A1 | 1/2005 | Barsness et al. | |
| 2005/0049931 A1 | 3/2005 | Wisnudel et al. | |
| 2005/0071045 A1 | 3/2005 | Clini | |
| 2005/0076020 A1 | 4/2005 | Huntley et al. | |
| 2005/0096936 A1 | 5/2005 | Lambers et al. | |
| 2005/0102191 A1 | 5/2005 | Heller | |
| 2005/0114205 A1 | 5/2005 | Nelson et al. | |
| 2005/0149446 A1 | 7/2005 | Le Pannerer et al. | |
| 2005/0172122 A1 | 8/2005 | Risan et al. | |
| 2005/0213489 A1 | 9/2005 | Jensen et al. | |
| 2005/0213491 A1 | 9/2005 | Nelson et al. | |
| 2005/0213492 A1 | 9/2005 | Jensen et al. | |
| 2005/0213493 A1 | 9/2005 | Nelson et al. | |
| 2005/0213494 A1 | 9/2005 | Nelson et al. | |
| 2005/0227773 A1 | 10/2005 | Lu et al. | |
| 2006/0011716 A1 | 1/2006 | Perkowski | |
| 2006/0028398 A1 | 2/2006 | Willmore | |
| 2006/0036549 A1 | 2/2006 | Wu | |
| 2006/0074679 A1 | 4/2006 | Pifer et al. | |
| 2006/0235755 A1 | 10/2006 | Meuller | |
| 2006/0235864 A1 | 10/2006 | Hotelling et al. | |
| 2006/0259426 A1 | 11/2006 | Blama | |
| 2007/0067340 A1 | 3/2007 | Lakamp et al. | |
| 2007/0214369 A1 | 9/2007 | Roberts et al. | |
| 2007/0228162 A1 | 10/2007 | Phillips | |
| 2007/0282747 A1 | 12/2007 | Shen et al. | |
| 2008/0005025 A1 | 1/2008 | Legere et al. | |
| 2008/0005802 A1 | 1/2008 | Fierstein et al. | |
| 2008/0071587 A1* | 3/2008 | Granucci | G06Q 10/02 705/5 |
| 2008/0082688 A1 | 4/2008 | Yi et al. | |
| 2008/0103974 A1 | 5/2008 | Fridhendler et al. | |
| 2008/0189390 A1 | 8/2008 | Heller et al. | |
| 2008/0201386 A1 | 8/2008 | Maharajh et al. | |
| 2008/0255901 A1 | 10/2008 | Carroll et al. | |
| 2009/0070122 A1 | 3/2009 | Hauck et al. | |
| 2009/0117846 A1 | 5/2009 | Mavrakakis | |
| 2009/0154899 A1 | 6/2009 | Barrett et al. | |
| 2009/0193153 A1 | 7/2009 | Thanos | |
| 2009/0204855 A1 | 8/2009 | Peters | |
| 2009/0276087 A1 | 11/2009 | Murray et al. | |
| 2009/0325602 A1 | 12/2009 | Higgins et al. | |
| 2010/0057563 A1 | 3/2010 | Rauber | |
| 2010/0070610 A1 | 3/2010 | Buttars | |
| 2010/0088192 A1* | 4/2010 | Bowles | G06Q 10/30 705/26.1 |
| 2010/0169652 A1 | 7/2010 | Butler | |
| 2010/0198726 A1 | 8/2010 | Doran | |
| 2010/0221938 A1 | 9/2010 | Liu | |
| 2010/0250347 A1 | 9/2010 | Rainier et al. | |
| 2011/0015934 A1 | 1/2011 | Rowe et al. | |
| 2011/0093622 A1 | 4/2011 | Hahn et al. | |
| 2011/0099104 A1 | 4/2011 | Nybom | |
| 2011/0161409 A1 | 6/2011 | Nair et al. | |
| 2011/0231273 A1* | 9/2011 | Buchheit | G06Q 20/12 705/26.1 |
| 2011/0314153 A1 | 12/2011 | Bathiche et al. | |
| 2012/0004770 A1 | 1/2012 | Ooyen et al. | |
| 2012/0011540 A1 | 1/2012 | Pullford | |
| 2012/0033537 A1 | 2/2012 | Hassler et al. | |
| 2012/0109787 A1 | 5/2012 | Larrick et al. | |
| 2012/0150343 A1 | 6/2012 | Baric | |
| 2012/0330152 A1* | 12/2012 | Reisinger | A61M 5/007 600/431 |
| 2013/0091055 A1 | 4/2013 | Doran et al. | |
| 2013/0191170 A1 | 7/2013 | Jarrett et al. | |
| 2013/0297431 A1 | 11/2013 | Deubell et al. | |
| 2014/0136351 A1 | 5/2014 | Lennon | |
| 2014/0208122 A1 | 7/2014 | Mathur et al. | |
| 2015/0278801 A1 | 10/2015 | Friedlander | |
| 2015/0294318 A1 | 10/2015 | Hui et al. | |
| 2015/0317619 A1* | 11/2015 | Curtis | G06Q 30/02 705/14.37 |
| 2016/0155208 A1 | 6/2016 | Zhao et al. | |

OTHER PUBLICATIONS

"Kaleidescape Conductor", Feb. 8, 2008; www.kaleidescape.com.
Brad Stone, "Software That Copies DVDs is on Trial", Apr. 24, 2009; http://www.nytimes.com/2009-04-24technology/2...html?_r=2&partner=rss&emc=rss&pagewanted=print.
"Kaleidescape 1080p Player, KPLAYER-6000"; Apr. 13, 2009.
Chris Albrecht, "MOD Systems Sees Video delivery Via SD Cards", Jan. 8, 2009.
"MOD Systems Corporate Backgrounder", Jan. 2009.
"Object Storae: A Dell Point of View"; Dell Inc., Round Rock, Texas, USA, Dec. 9, 2010; 11 pp.
"VCAS Verimatrix Content Security Manager"; Verimatrix, Inc.; San Diego, CA, USA; Aug. 29, 2010; 2 pp.

(56) References Cited

OTHER PUBLICATIONS

VCAS Verimatrix ViewRight STB for IPTV; Verimatrix, Inc.; San Diego, CA, USA; Aug. 29, 2010; 2 pp.
"Panasonic Ideas for Life", http://www2.panasonic.com/consumer-electronics/shop/Video/Blu-ray-Disc-Players/model . . . .

* cited by examiner

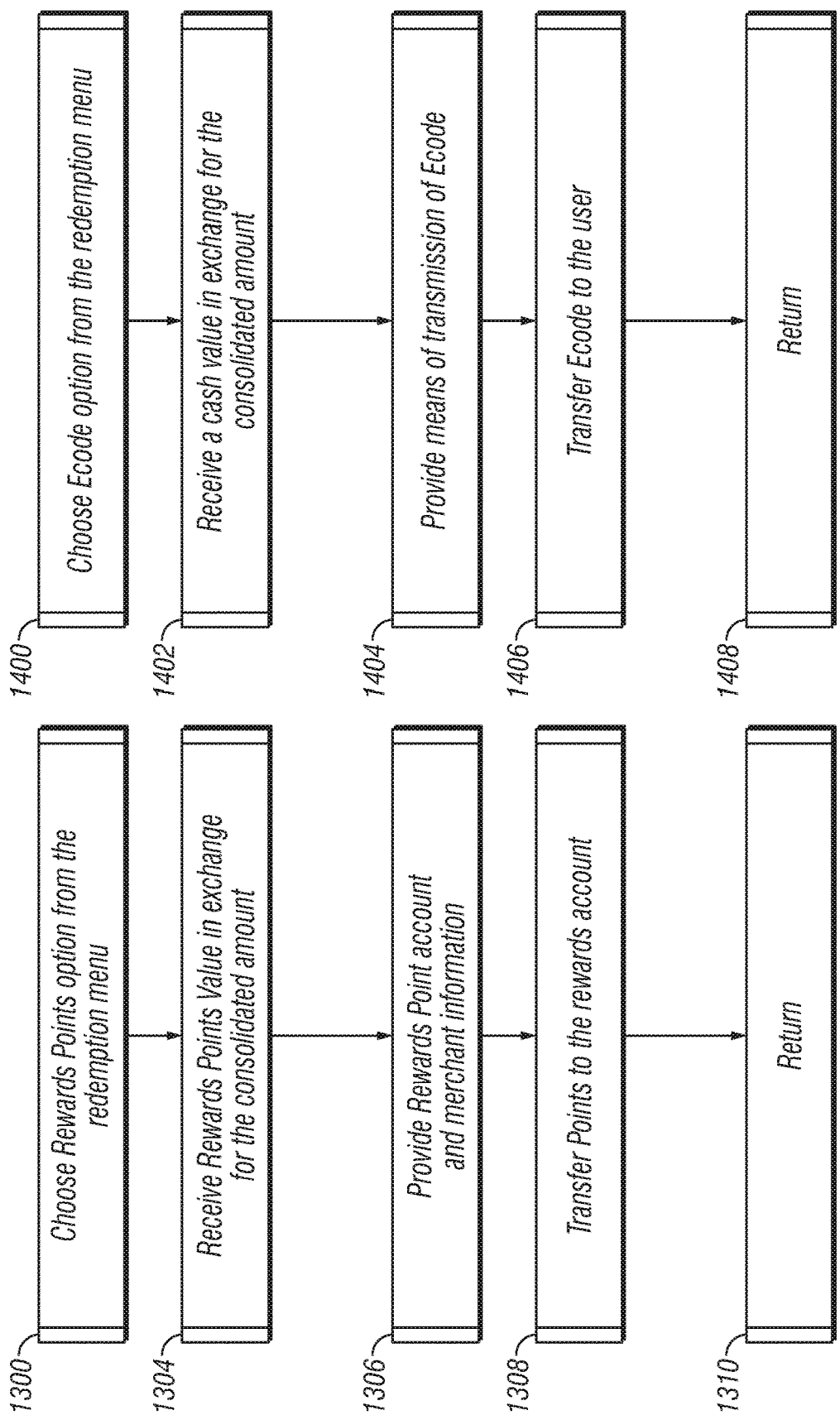

SYSTEM AND METHOD FOR MEDIA TRADE-IN

BACKGROUND

1. Field of the Disclosure

The field of this invention is a system and method of trading physical and digital media items for a specified value. Specifically, an all media trade-in kiosk to facilitate an exchange of a media item for a pre-determined return value.

2. Background

In a world filled with electronics and other forms of media, the number of unused media items is increasing at an exponential rate. For example, in the 1990s everyone had VHS tapes and game cartridges, in the 2000s people migrated to DVDs and gaming discs, and in the 2010s the cloud has become the media source to use. Because of the migration to the cloud, people now desire to exchange their old DVDs and cartridges for some form of value. The same is true for old video game consoles and games which become obsolete as the latest versions are introduced. To put it into perspective, the video game market in 2011 was approximately a 16.6 billion dollar industry. Nintendo, one of the largest video game console makers, sold 99.4 Nintendo Wii units in 2012 before the release of the next generation Microsoft X-Box and Sony Playstation. Human nature always desires the newest and greatest invention or technological improvement. However, in some cases, those that hold onto items see an increase in value. A quick Google search of collectable video games brings list after list of games that can range in price estimates of a couple hundred dollars to several thousand and, for some of the rarest games, thirty thousand dollar or more.

While the concept of trading in an old design for a newer model is nothing new, in the media marketplace, human interaction has always been required to complete an exchange. Currently in the marketplace, there are machines that allow a user to purchase or rent movies or video games from a kiosk and return them in a similar manner. Users can become frustrated if the media they have purchased or rented is not in a condition for their use.

Other systems allow a user to receive a fixed amount in exchange for a media item regardless of the quality or authenticity of the item. These systems do not calculate the value of the media item nor do they check for damage. Furthermore, these systems do not consider inventory or demand for the media item and provide only a bare minimum in exchange for the media item. While, other systems only accept the media item and none of the related packaging or documentation, leaving the user to throw away or keep the extra items they do not need. Finally, there are systems that determine a value of an item based on the current inventory available and demand for that item in its own local market.

What is missing from these mentioned systems is a kiosk system that allows the user to provide all the documentation and packaging of a media item during the trade-in process, and return multiple items at a time. In addition, the systems also should be able to consider not only the inventory and demand for the media item a local or system wide context, but also consider retailer inventory and demand for the media item. Moreover, the ability to base value calculations not only on the local markets but also on retailer level markets, allows the system to maximize the return to the user. An additional benefit of this would also include the ability to create vendor based exchange values that would not otherwise be available due to a lack of connection with outside advertisers, vendors, and retailers.

BRIEF SUMMARY

Disclosed is a system and method for media trade-in. The kiosk system allows users to insert or scan media items for trade-in, in return for a gift card, retailer stored value card, cash, or other forms of value exchange or currencies. The kiosk receives the media through a single or plurality of openings. After the kiosk receives the media item, it can verify the media item for authenticity and lack of damage.

The verification subsystem process checks the media items for physical damage through two main categories. First, is damage that results in the file being unreadable, for example, a media disc with a hole or a void through it. Second, is evaluating the gradient physical damage such as scratches and visible marks, which in most cases will not affect the playability depending on the severity.

Once physical damage level of the media item is determined to be below a specific threshold, a verification of its authenticity is performed to ensure the media is not a copy or a fake. If the media item has made it through both of these analyses, then the next step in the process is determination of the trade-in value of the media item.

The exchange subsystem process is used to make the determination of exchange value of the media item that is performed by the valuation algorithm process. This algorithm searches the inventory and demand of each media item, in addition to updating the value database with the most recent values. The valuation algorithm can also update the value database on a regular interval, not just when an exchange is occurring. Some of the items the valuation algorithm takes into account are the level of damage to the media, the level of damage to the original packaging, and the level of damage to the original documentation.

Once the value of the media item has been determined, the exchange subsystem, in combination with the valuation algorithm process, will determine the adjusted exchange value or redemption offer based on the preferences of the user and the location of the kiosk. The adjusted exchange value is then provided to the user for acceptance. If the user chooses not to accept the exchange value, the kiosk returns the media items the user determines they do not want to exchange or trade-in at that time.

For the media items the user wishes to accept, the exchange value for the exchange subsystem process transfers the data to the accounting subsystem process for processing. Using the exchange value determined from the valuation algorithm and exchange subsystem process, the accounting subsystem process allows the user to choose their specific redemption option from the redemption menu. These redemption options can include trade-in and cash values. In most cases the trade-in value will be higher than the cash value to encourage consumers (users) to be loyal to a brand or retailer. The redemption option is then processed for the user, and if an option results in a card or receipt, the card or receipt is printed for the user via the kiosk. The data from the processed redemption option is then returned to the exchange subsystem process that updates the inventory and demand databases for future calculations.

BRIEF DESCRIPTION OF THE DRAWINGS

FIG. 13 illustrates the reward points redemption process.

FIG. 14 illustrates the eCode redemption process.

DETAILED DESCRIPTION

Disclosed is a system and method for media trade-in. The system utilizes a kiosk to perform the media trade-in method and process. In an exemplary embodiment of the present invention, the system comprises a kiosk with the ability to accept media items, verify their authenticity and playability, determine the value of the media item, and provide an exchange value in exchange for the media item.

Some of the benefits and improvements over previous systems include the ability to include the media item and its associated packaging and documentation with the media trade-in. Additionally, this system allows for greater interface between the inventory and demand databases of retailers and vendors that can be used to update the system value database. Moreover, by interfacing with retailers and vendors, the system can also provide additional exchange values based on the benefits and rewards of the participating retailer and vendors. An additional benefit over previous systems is the ability to take in multiple media items at a time.

Figure 1:
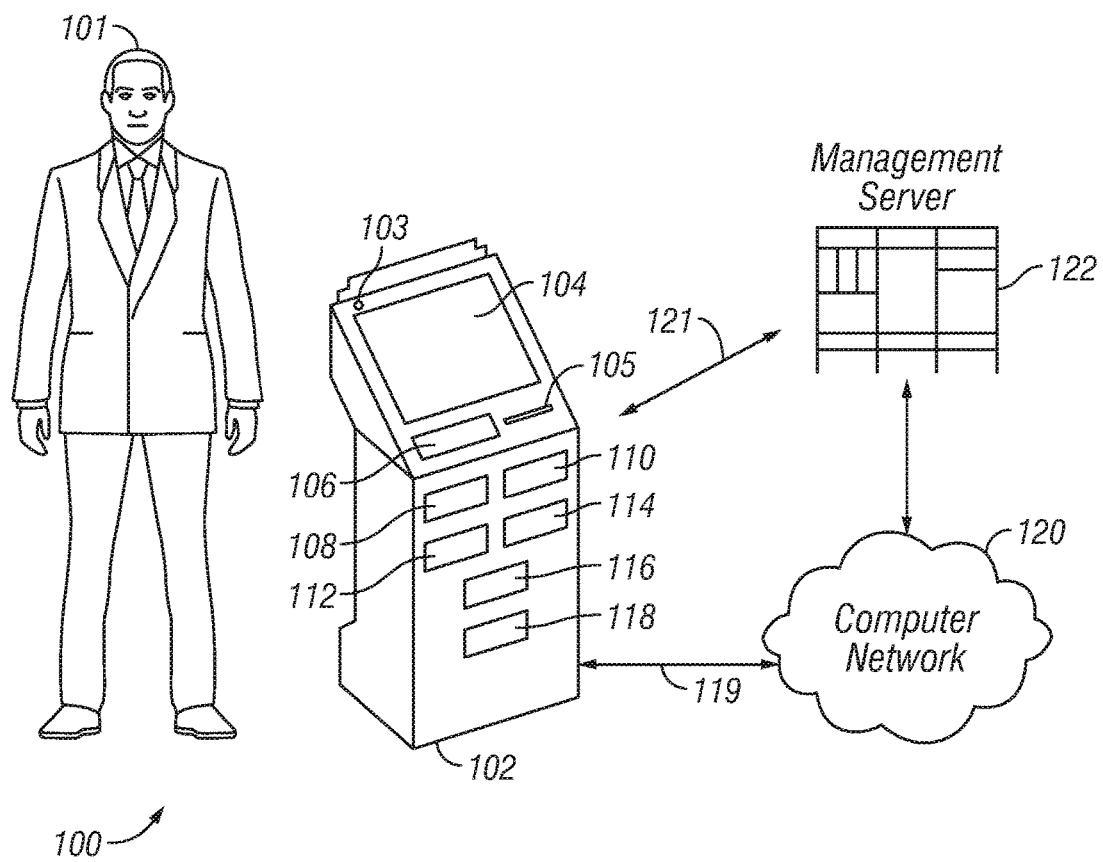
FIG. 1 illustrates a perspective view of the media trade-in kiosk system.

FIG. 1 illustrates the media trade-in kiosk system 100 that allows a user 101 to exchange media items including but not limited to movies, audio recordings, video games, and software, for an exchange value. The movies, audio recordings, video games, and software can be comprised of, but not limited to, optical discs such as CDs, DVDs, Blu-rays, HD-DVDs, mini-discs, as well as USB drives, mini-drives, hard drives, cartridges, game cartridges, and memory cards.

Each kiosk 102 is a standalone system, of a rectangular design that includes a square base, a rectangular front, and a rearward tilting face that includes a display 104. The kiosk 102 encloses the internal operational components of the system. The display 104 can be a touchscreen or other manner of display with a user input device 106 for interfacing with the user 101. A camera 103 is also available above the display 104 to allow the user to interface with live support throughout their experience as needed. The display 104 and the user input device 106 allow for user interaction with the kiosk interface. The user input device 106 can include, but is not limited to, a touchpad, a touch screen, a keyboard, a trackball, or a computer mouse. Along the rectangular front portion of the kiosk 102, are a plurality of slots or openings such as a media acceptance slot 108, and a receipt printer slot 110. Additional slots or openings that can be included in alternative embodiments that do not fall outside the scope of the invention are a media packaging slot 112, a media documentation slot 114, a card return slot 116, and a cash dispensing or receiving slot 118. It would be understood that these slots could be presented in a number of combinations, orders, and presentations, and are not limited by their description as a slot as the dimensions required for their purpose may change over time.

The kiosk can communicate with a computer network 120 through the management server 122. The management server 122 can be a part of the kiosk 102 or a remotely connected server accessible through the computer network 120. The computer network 120 can be a private network, utilizing a hardwired or private wireless network, or a public network such as the internet.

It would be understood by someone skilled in the art that the computer network 120 and management server 122 could be interconnected with the kiosk in multiple ways. Two of those are through a remote connection 119, where the management server 122 is connection to the kiosk 102 via the computer network 120. There is also direct connection 121, where the management server 122 is incorporated within the kiosk 102 and then connected to the computer network 120 through a communication system (not shown).

Figure 2A:
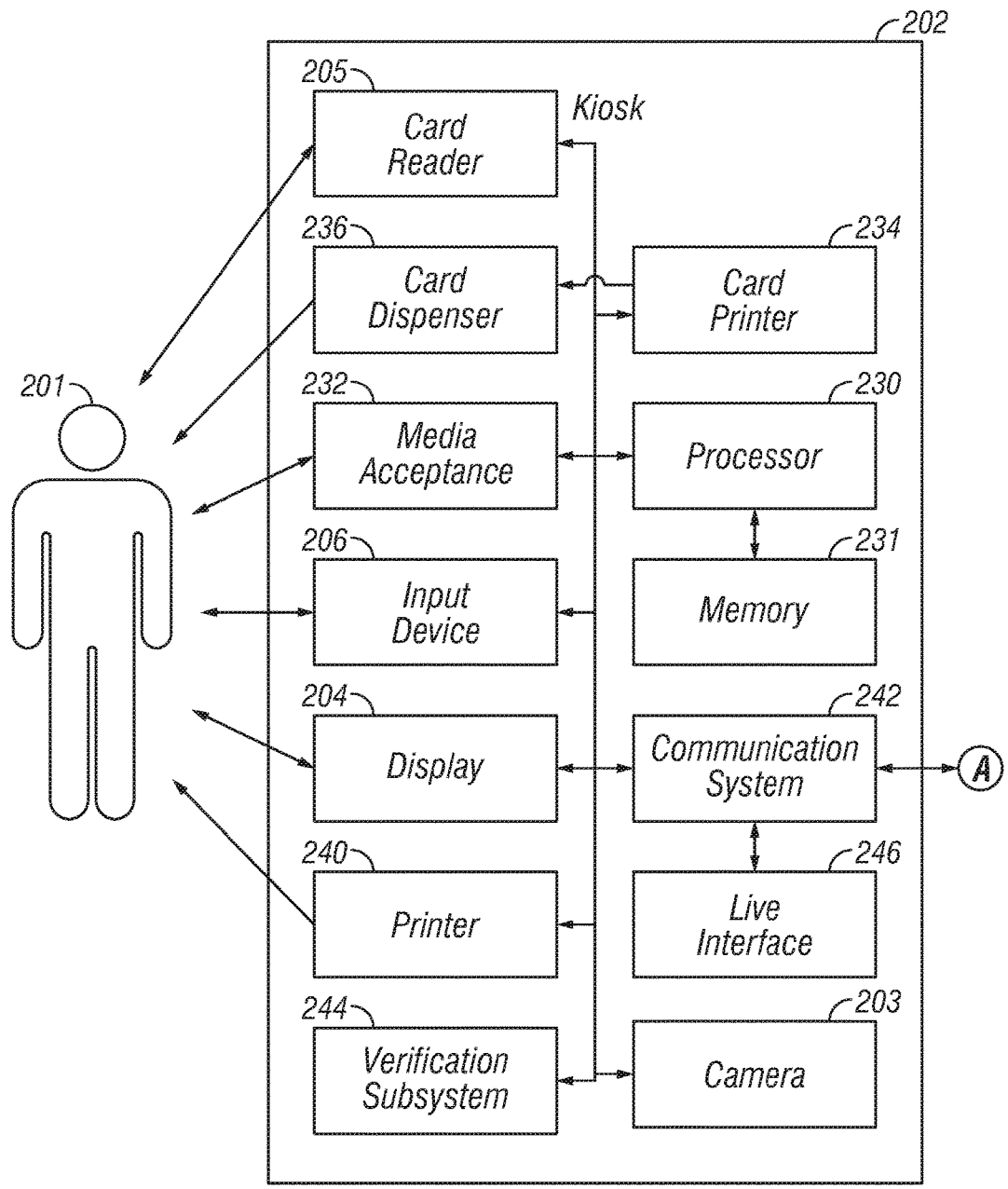
FIG. 2A shows a system level view of the media trade-in kiosk system and networking connections.
Figure 2A:
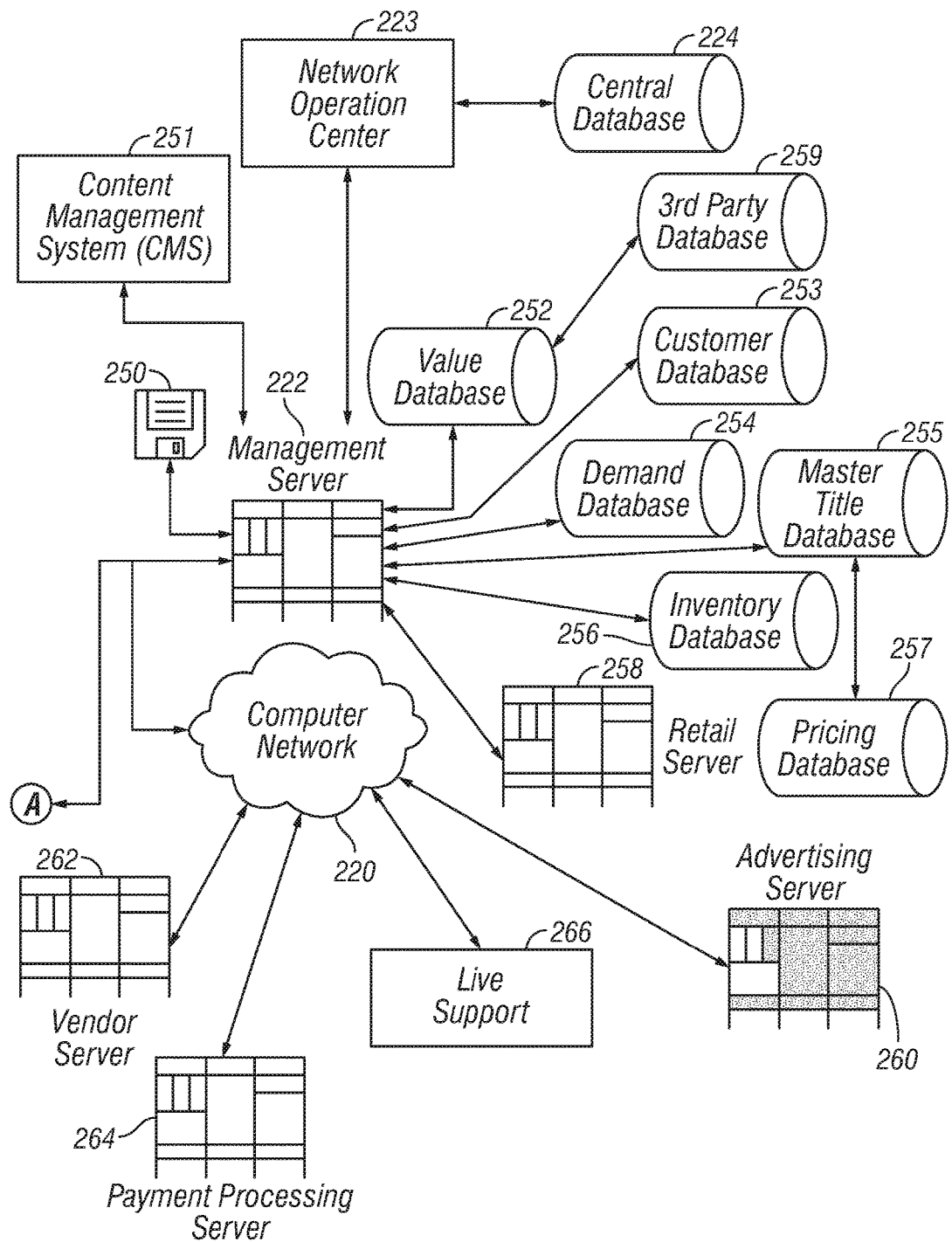

FIG. 2A shows the interconnectivity of the kiosk 202, the management server 222, and the computer network 220. Within the kiosk 202, is a processor 230 for controlling various aspects of the kiosk 202. The processor 230 connects with the display 204, and user input device 206, for receiving user input and feedback, as well as providing a user 201 with information regarding their trade-in or exchange. The processor 230 controls a media acceptance subsystem 232 that can receive a media item (not shown) from the user 201. The media acceptance subsystem 232 in a preferred embodiment can utilize a series of mechanical devices to capture and accept the media item. The mechanical devices can include gears, motors, actuators, tracks, and other known methods of mechanically or electro-mechanically receiving media items. Additionally, the media acceptance system can also provide for the acceptance of the associated packaging and media documentation. In alternative embodiments of the present invention, the associated packaging and media documentation can be placed in a separate recycling bin within the kiosk if they are unsatisfactory for reuse or are not needed for the associated media item. Once the media acceptance subsystem 232 has received the media item, then the processor 230 triggers the transfer of the media item for processing by the media verification subsystem 244. The media verification subsystem 244 determines the viability and authenticity of the media item through known methods, specifically, an imaging system and a database that is updated from a central location and downloaded to all kiosks daily. The database can include media item identification characteristics, known identifying markings, media item data file information, and other media item verification information. The media verification subsystem 244 utilizes optical, camera, laser, and other methods of visual and contact analyses. The optical system utilized by the media verification subsystem 244 can include, but is not limited to, a high definition camera system. These include, but are not limited to, pinhole or void verification along the media items as well as methods for authenticating the media item through checking for security data, symbols, and labels. Additionally, the media verification subsystem 244 can utilize data regarding security features employed on various titles, downloaded daily from a database and in an exemplary embodiment of the present invention, the database would be the master title database 255.

Figure 2B:
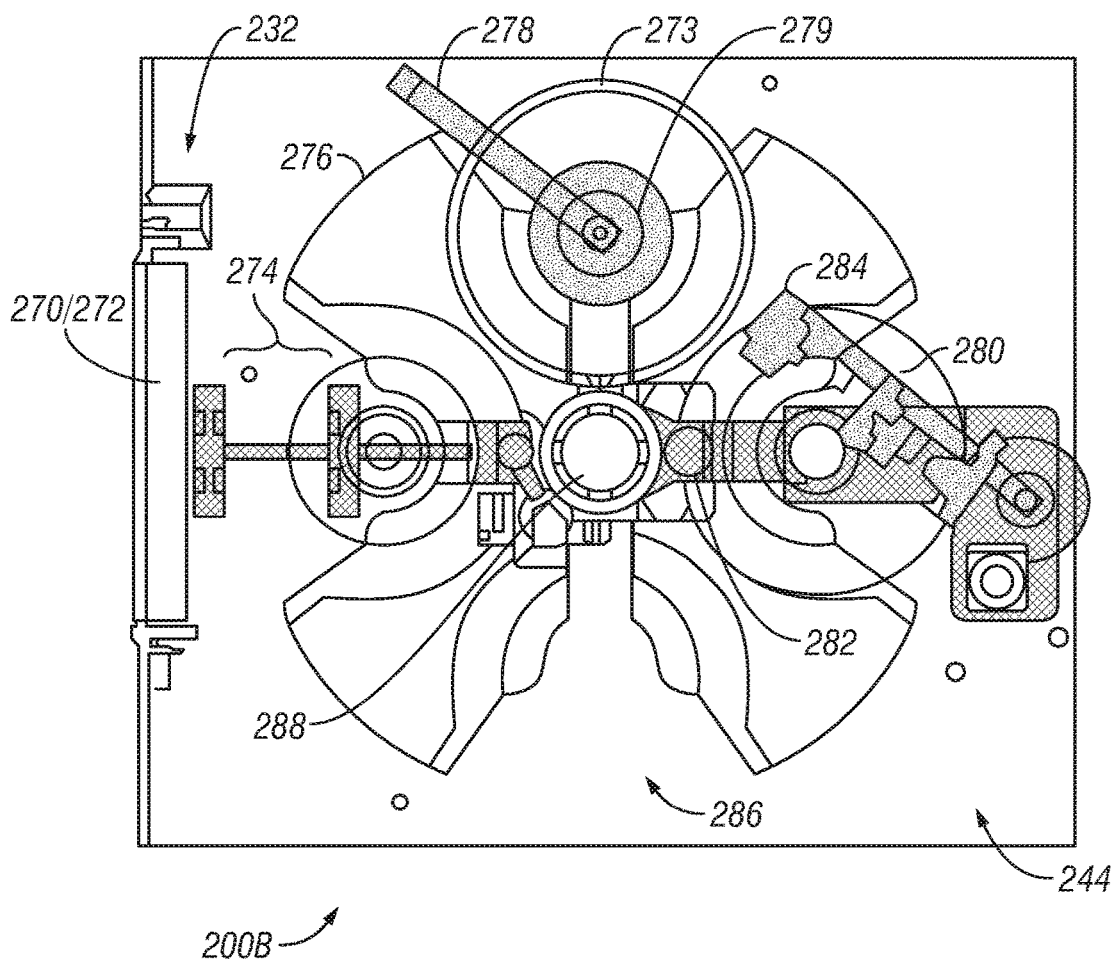
FIG. 2B shows a top view of the media item acceptance and verification subsystems.
Figure 2C:
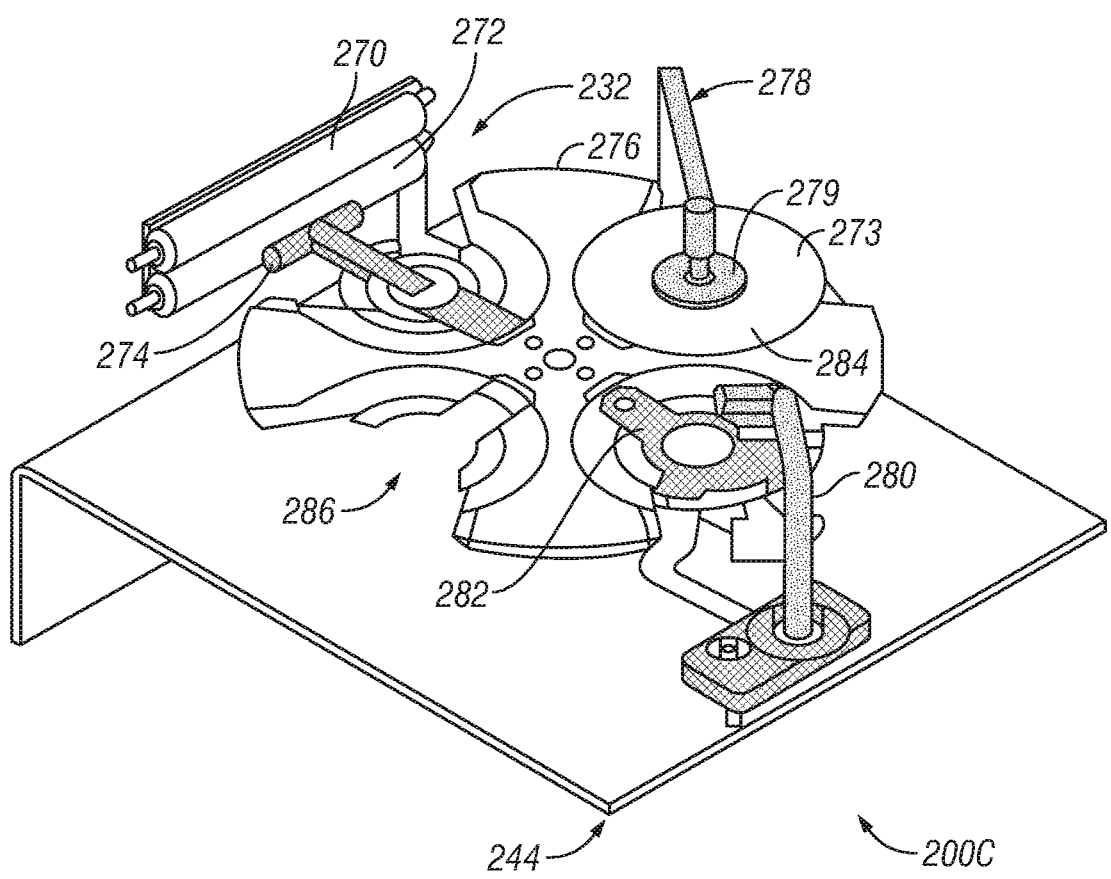
FIG. 2C shows a prospective view of the media item acceptance and verification subsystems.

In an exemplary embodiment the media acceptance subsystem 232 can be directly associated with the verification subsystem 244 as seen in FIGS. 2B and 2C, FIG. 2B illustrates a top view of the media acceptance subsystem 232 and the verification subsystem 244, while FIG. 2C shows a prospective view of the media acceptance subsystem 232 and the verification subsystem 244. The media acceptance subsystem 232 allows the kiosk 202 to accept the media item 273 utilizing the upper support 270 and the lower support 272. The upper and lower supports 270 and 272 can be motorized or non-motorized in order to move the media item internally into or out of the kiosk 202. The upper support 270 and lower support 272 work in conjunction with the media acceptance slot 108. The supports would be made of a material, including, but not limited to, foam or cloth like materials that would not cause injury to the media item 273, and could be different shapes that can also allow for the movement of the media item within the kiosk 202. In alternative embodiments, the upper support 270 and lower support 272 would be fixed in place and use fibers or alternative shapes to clean or remove any additional material from the media item 273 as the kiosk 202 using a media transfer engager 274 receives it.

Once the media item 273 proportionally transverses the upper and lower supports 270 and 272, the media transfer engager 274 can engage with the media item in such a way as to transfer it from the upper and lower supports 270 and 272 to the carousel 276. The media transfer engager 274 can include, but is not limited to, posts, arms, fingers, disc media trays and other mechanical or electro-mechanical methods of receiving and capturing the media item 273, The carousel 276 moves the media item 273 through the stages of the verification subsystem 244. The carousel 276 is moved utilizing a combination of a motor and plurality of gears or belts 276. The plurality of gears or belts could also encompass other known methods of mechanical power transmission. The motor and plurality of gears 276 can include, but is not limited, to a stepper motor, a Direct Current motor, worm gears, intersecting gears, belts, or a combination thereof. It would be understood that the different stages could be placed in any number of combinations without departing from the spirit of the invention.

An authenticity and security elements stage 278 allows the media item 273 to be analyzed for authenticity and security elements. The authenticity stage performs analysis of the media item 273 through processes such as, but not limited to, reading the data on the disc, analyzing the disc for holographic or other security images on the disc, or reading the security data ring. At each stage of the verification subsystem 244, the media item 273 can be read by optical, camera, laser, and other known methods of reading data such as, but not limited to, the rotation of a media disc to allow for optical or laser reading. The optical scanning unit 279 comprising an HD camera or other imaging system as part of the scanner that takes a picture of the hologram and then allows the processor to authenticate the media item 273 by verifying security marking such as holographic, images or labels along the surfaces of the media item 273.

The pinhole and physical damage stage 280 allows the media item 273 to be analyzed for gradient depth of the physical damage and readability. The pinhole and physical damage stage 280 also has an imaging and light emitting arm 282 that works in conjunction with the imaging and light detection head 284. The imaging and light emitting arm 282 captures images of the media item's readable surface as well as shining a light source on the media item surface. The imaging and light detection head 284 captures images of the readable surface of dual layer media items, while also moving with the imaging and light emitting arm 282 to determine if there are any pinhole or voids in the media item 273. The imaging and light emitting arm 282 can have the imaging and light detection head 284 both above and below the media item 273. This is to ensure that the readable surface of a media item 273 is captured. The imaging and light detection head 284 can include a plurality of high powered LEDs, a high definition optical sensor capable of capturing still or video images, and a laser unit for measuring the gradient thickness of the media for damage such as deep scratches.

Figure 2D:
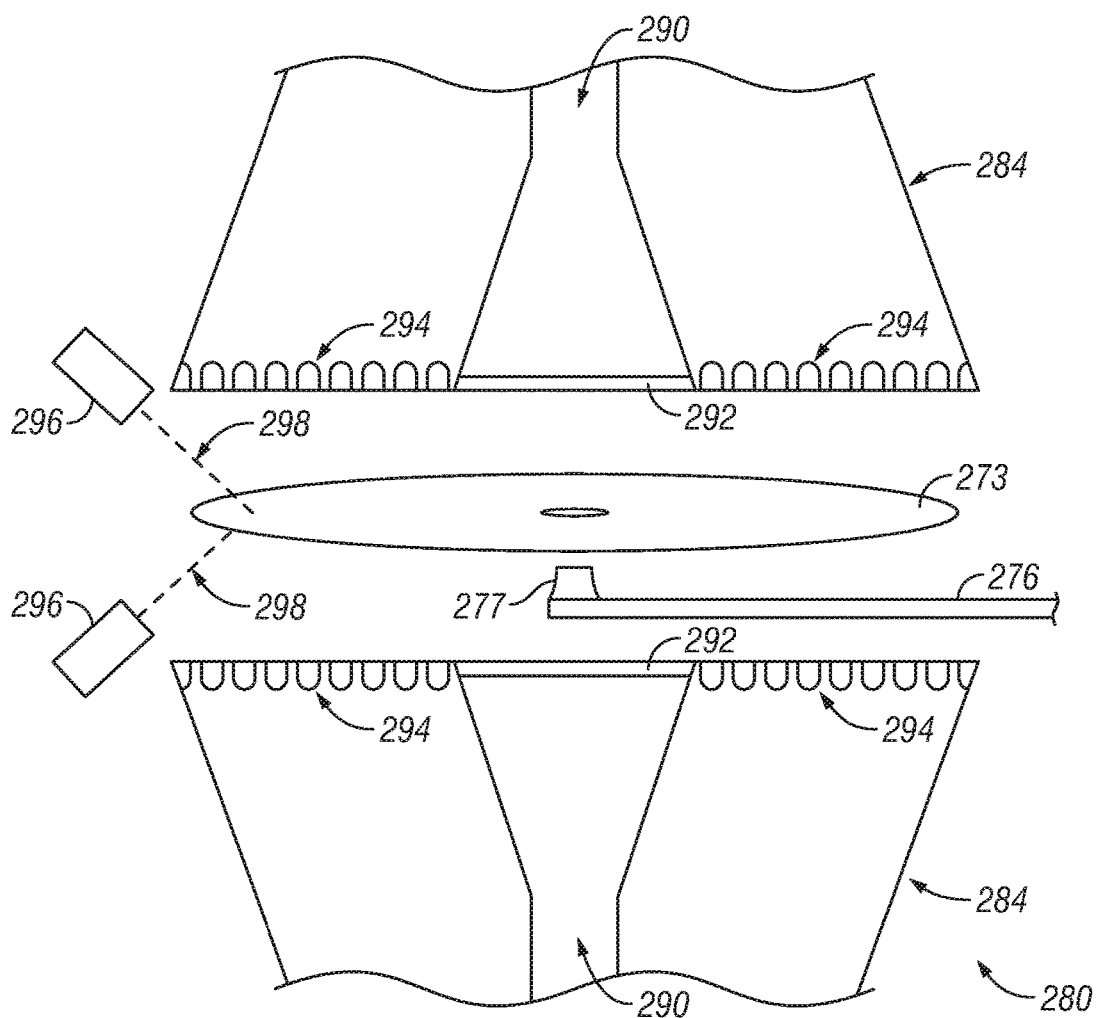
FIG. 2D illustrates a dual image, light detection and producing head for the physical and pinhole damage detection stage.
Figure 2E:
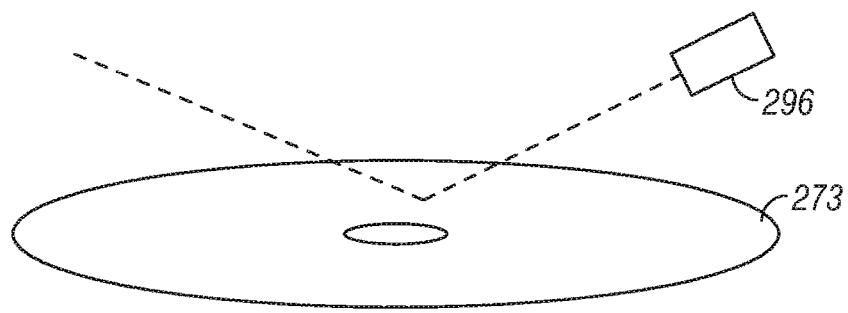
FIG. 2E illustrates a laser used to detect gradient damage of a media item.
Figure 2F:
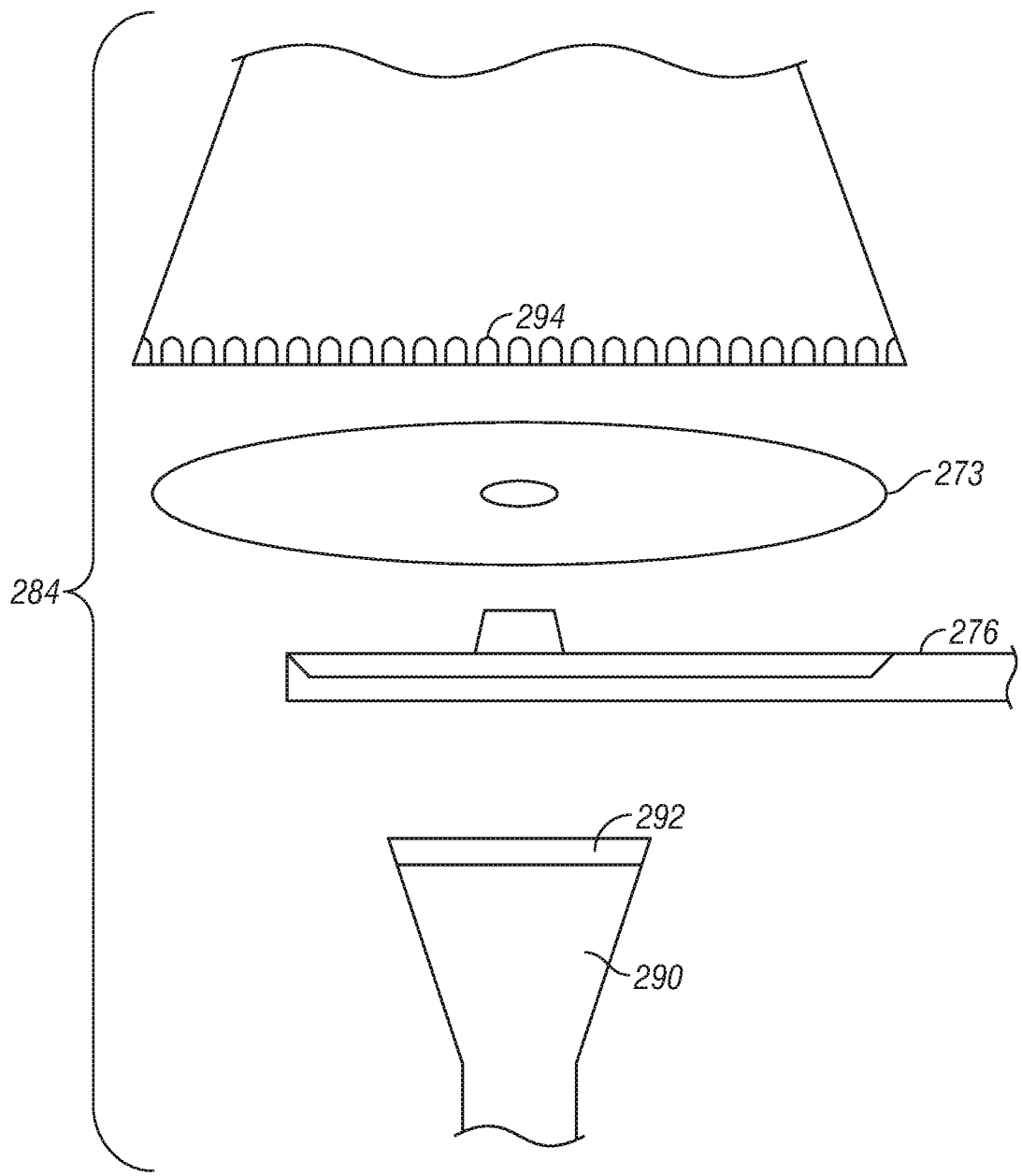
FIG. 2F illustrates a single image, light detection and producing head for the physical and pinhole damage detection stage.

FIG. 2D-2F illustrates a cutaway view of the pinhole and physical damage stage 280. In the exemplary embodiment a dual imaging and light detection head 284 in addition to being a light producing head is illustrated. It would be understood by someone skilled in the art that a single imaging and light detection head 284, or a split imaging and light detection head 284 and a light producing head (not shown) could be utilized as well. The dual imaging and light detection head 284 and producing head can comprise an imaging unit 290, such as a high resolution or high definition camera capable of capturing still or video images. The imaging unit 290 also has a lens 292 that can be a fisheye or other wide angle lens that would allow the imaging unit 290 to capture the whole media item 273 with one capture. The head 284 also can comprise a plurality of high power or high intensity light emitting devices 294 such as LEDs or other light sources. These light emitting devices 294 allow the imaging unit 290 to capture an image that can be analyzed by the verification subsystem for any pinholes, voids, or other physical damages.

The carousel 276 can move the media item 273 after the verification stages to a storage position 286. In addition, the kiosk 202 could include a carousel with additional slots or a second carousel to store additional media items during a media trade in, allowing a user 201 to provide multiple media items for trade-in at one time. Similarly, for an embodiment that includes the media item packaging and documentation receiving slots or receptacles, similar media acceptance subsystems and verification systems to those describe above are utilized.

The carousel 276 for the verification subsystem for use with packaging and documentation would utilize a tray system with glass or other transparent material such as a polycarbonate. A clear conveyor belt could also be utilized as well as an alternate to carousel 276. The mechanical, electro-mechanical, and electrical components are controlled via the processor 230. For USB drives or memory cards the memory acceptance subsystem can include a module that would read the device, if readable then it would be pulled into the kiosk for physical damage verification and media trade-in. The module would then be replaced with an empty module. Alternatively, the USB or memory card attachment system could be released from the kiosk 202 that connects securely to an internal storage area.

Returning to FIG. 2A upon successful verification of the media item with the media verification subsystem 244, the processor 230 can begin communications with the management server 222 via the communication system 242. The communication system 242 can include a LAN or WLAN card to allow the kiosk 202 to communicate with a plurality of databases, systems, subsystems, and servers. The management server 222 can initiate an exchange subsystem process 600 (as described in FIG. 6) to calculate the exchange value of the media item. The exchange subsystem process 600 utilizes data from local or remote databases such as the value database 252, customer database 253, demand database 254, master title database 255, inventory database 256, and pricing database 257. The customer database 253 allows for customer profiles to be stored and retrieved, along with data regarding each user's transaction. The user 201 can decide to save the value they receive during their trade-in within the customer database 253 in their customer profile, which can be retrieved utilizing a plurality of customer identifiers such as, but not limited to, phone number, pin number, username, email, and passwords. In alternative embodiments the pricing database 257 and value database 252 can be incorporated into a single value and pricing database (not shown). The value database 252 can also be linked with a $3^{rd}$ party database 259 which could include a $2^{nd}$ hand resale/retailer verification database information, or incorporation of additional values and verifications within the pricing and trade-in structure from membership programs, studios or other value amount providers. The pricing database 257 is connected to the master title database 255. The pricing database 257 maintains the current retail pricing, membership pricing structures, suggested retail pricing, and/or other pricing information such as foreign exchange rates for independent or foreign films. These databases 252, 253, 254, 255, 256, and 257 can be locally stored on the management server 222, or remotely connected to the management server 222. In alternative embodiments, the databases 252, 254, and 256 can also be connected remotely to retail server 258, vendor server 262, or advertiser server 260.

Each of these servers can be connected directly or remotely to the management server 222 through the computer network 220. In an exemplary embodiment, the inventory database 256 and demand database 254 would be connected and synchronized to the retailer and vendor inventors and demand databases while the value database would be under the control of the kiosk trade-in system. The management server 222 can accept computer readable medium 250 for running executable programs or data transferability to the local server processor (not shown) or processor 230. A Content Management System ("CMS") 251 is also connected to the management server 222 to provide for the management of incoming and outgoing digital content. In addition, the CMS 251 can also maintain and interface with the various databases and servers to ensure connections to remotely stored media and that locally stored media is up to date. Through the utilization of a valuation algorithm subsystem, an exchange value for the media item can be calculated along with redemption offers that are returned to the processor 230 for interfacing with the user 201 through the display 204 and/or the input device 106.

A Network Operation Center 223 is connected to a central database 224 and the management server 222. The connection can be a direct connection or a computer network connection via a private or public network. The central database 224, can include firmware, media, and other information that must be downloaded directly to the kiosk 202. The download from the central database 224 can occur hourly, daily, weekly, etc., depending need for updates.

The user 201 utilizes the display 204 and/or the input device 206 to interface with the kiosk 202 to accept or deny the available redemption offers. Throughout the process, the user 201 can request live support utilizing the camera 203, display 204, the input device 206, as well via the live interface 246 that communicates with the remote live support system 266 via the communication system 242 and computer network 220. It can be understood that the camera 203 can also include a microphone for voice communication. Once the user 201 has accepted the redemption offers, the processor 230 can print a receipt via the printer 240. If a gift or reward card has been selected, the processor 230 can initiate the card printer 234 to provide the printed gift or reward card to the user 201 via the card dispenser 236. If the user 201 has an already existing gift card or reward card and would like to add the amount to it, the user can utilize the available card reader 205 to add additional amounts to the card. The amount of the redemption offer is processed through a payment processing server 264 providing the data to the card, or creating a cash or bank account transfer.

Figure 3:
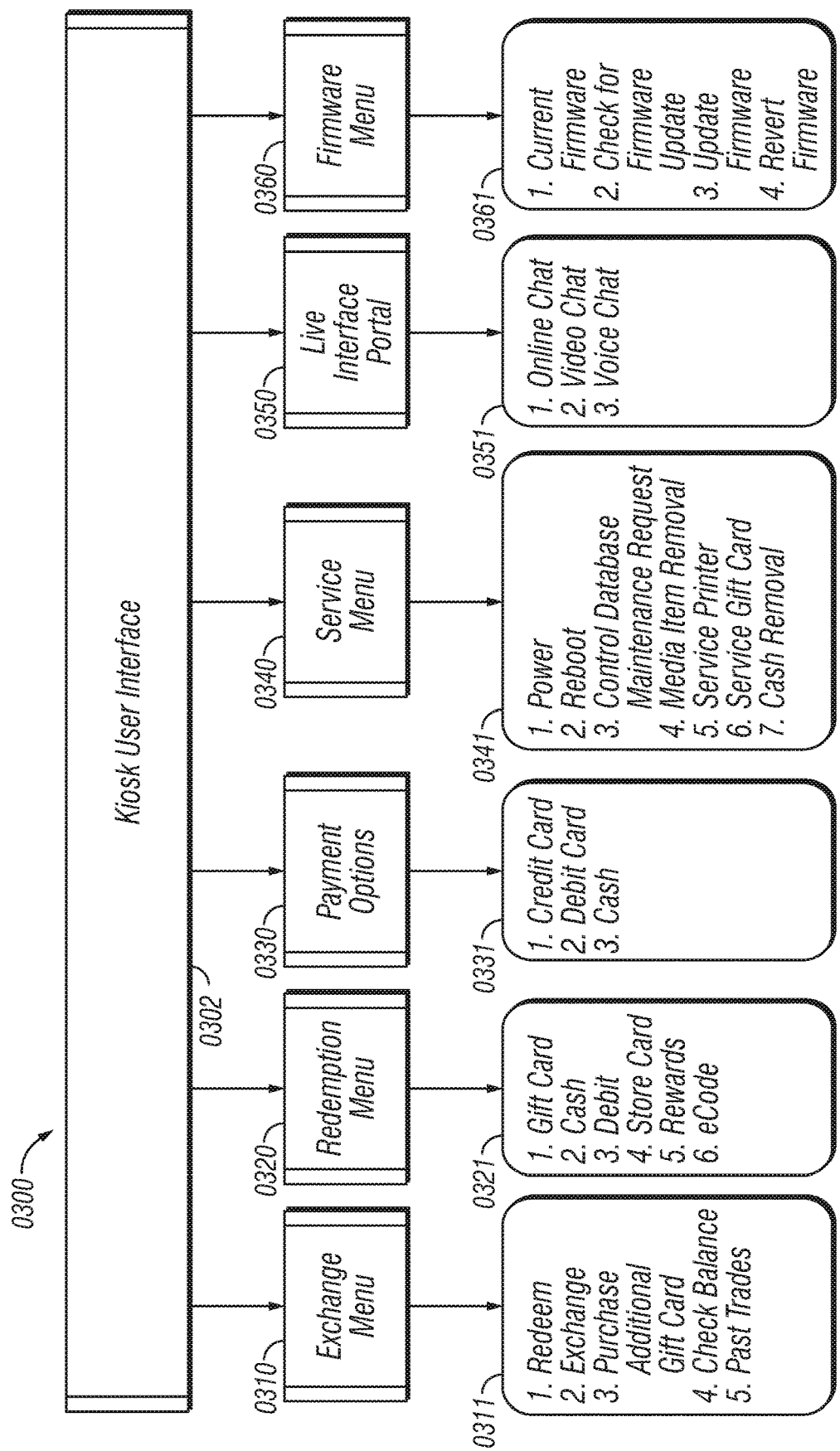
FIG. 3 illustrates the kiosk interface menu flowchart.

In FIG. 3, an illustration of the kiosk interface system 300 that includes the kiosk interface 302 is seen. The kiosk interface 302 is comprised of the display (not shown) and/or the input device/ingesting mechanism (not shown). A user can utilize the kiosk interface 302 to select a variety of options from the available kiosk interface menus 310, 320, 330, 340, 350, and 360. These menus allow the user to select the option to redeem previously exchanged values (printed receipts), initiate a new trade-in, process payment, and interface with live support. Additionally, the system administrators can also interface with the service menu 340 for performing service tasks related to the kiosk and the kiosk interface 302.

When a user initiates use of the kiosk interface 302, one of the menus available to them is the exchange menu 310. The user can utilize the exchange menu options 311 to redeem a previously exchanged voucher or receipt (option 1), continue an trade-in from a previous exchange session (option 2), purchase an additional gift card with or in addition to the voucher or receipt value (option 3), check the balance of the voucher or receipt (option 4), and review past trades (option 5). A user utilizing option 1 can utilize a voucher or receipt received during a previous exchange that was not redeemed at that time. This allows a user to build up the exchange value they have available prior to redeeming a larger value rather than just a single trade-in. Under option 2, a user can continue a trade-in that had previously been initiated with a pervious media item, and add additional media items to the trade-in that the user may not have had in their possession at the time of the previous trade-in initiation. Option 3 allows a user to purchase additional gift cards or reward cards above the redeemed exchange value. Once a user chooses option three they are transferred to the payment options menu 330. The final option in this menu is the check trade balance option, which allows a user to verify the amount available from the voucher or receipt. In some cases, the voucher or receipt will be time sensitive and be reduced in value for time period following an expiration date. Thus, a user may need to verify the amount on the voucher or receipt before beginning a trade-in or redemption. Option 5, allows a user to review previous or past trades to determine if they would like to trade a particular item or, in some cases, see if they had previously traded in a game or DVD prior to purchasing.

The redemption menu 320 allows a user to choose their preferred method of redemption offer through redemption menu options 321. For example, a user may decide to trade-in a media item for a gift card (option 1). The gift card may be from a retail store where the kiosk is located or it may be another retailer or vendor. In a similar manner, another option available is to trade-in the media item for cash (option 2). Since cash, in particular U.S. dollars is one of the main currencies throughout the world, the cash offer is significant to making the program work. The third option is related to option 2, however, it allows the user to provide banking information and have the cash offer deposited directly to the user's bank account (option 3). With some banks attempting to increase traffic in their physical locations, a media trade-in kiosk offering bonus rewards or bank features in exchange for utilizing the debit option is a possibility. Following this idea closely is the fourth option for a store card (option 4). Many stores, retailers, or other locations that will allow and utilize the media exchange trade-in kiosk have their own gift card/stored value programs. Because a retailer has their own gift card program, they would, more likely than not, like to increase the number of people within their stores. Therefore, they can request that the media trade-in kiosk provide an increased redemption offer for gift cards issued for their particular stores, retailers, or other locations. Along those same lines, a user can also choose to exchange their media item for rewards (points, cash, or other reward program currency) (option 5). Much like the gift card redemption offer that can be increased if the user will accept a gift card to a specific store, retailer, or other location, the rewards offer can also be increased if the user is willing to limit their exchange value to those stores, retailers, or other locations. The final option in the exchange menu 320 is the eCode option (option 6). An eCode allows a user to utilize the exchange value in an online environment. In addition, an eCode can also be utilized as a form of voucher that must be redeemed in exchange for another form of tangible value. For example, a user trades in a media item two days before National Cookie Day. A national cookie vendor that has no reward or gift card program creates an eCode voucher that can be exchanged for a certain number of cookies based on the value of the media item trade-in at the kiosk. Thus, an eCode can do more than just be utilized as online gift card. An additional card or voucher that could be included is a promotional item or card. It should also be understood that in certain cases a retailer or brand may want to encourage users to utilize a gift card, eCode or one of the other card or voucher programs rather than the cash value. To achieve this goal, retailers or brands may set their trade value higher than the cash value.

The payment options menu 330 allows a user to add additional value to the redemption offers (except for cash and bank debit). An example of this would be a user exchanging one of the popular games of the past year that is valued by the kiosk valuation algorithm at $22.00; however, the user is exchanging the game to get a gift card, store card, eCode or other exchange option for a friend's birthday. The kiosk allows the user to round the value of the chosen gift card, store card, eCode or other exchange option up to $25.00 and pay the difference through the credit, debit, or cash payment options 331. The credit and debit card payment options (option 1 and option 2) allow the user to use the kiosk card reader to submit payment for the additional amount owed. If the user utilizes cash, they can use the cash slot on the kiosk to provide the amount, and be provided change utilizing the cash slot if change is required.

The service menu 340 allows a system administrator to perform maintenance and other service tasks related to the kiosk unit of the kiosk media exchange trade-in system. The system maintenance and service menu options 341 can include, but are not limited to, power (option 1), reboot (option 2), central database maintenance request (option 3), trade media item removal (option 4), service printer (option 5), service gift cards (option 6), and cash removal (option 7). Options 1 and 2 allows the service technician to perform power operations to the kiosk unit such as shutting it down, setting a timed power down, pre-setting future shut down, and performing a power cycle to reset the overall system, however, it is not limited to these operations. Option 3 allows a service technician to request service by the network operation center to an aspect of the central database. For example, if the kiosk is returning an exchange value of $1.00 for every media item a user inserts, a service technician can request the network operation center to perform maintenance to the kiosk connection to the databases, the downloaded programs, or the files on the kiosk. In addition, the central database, or the other network databases may require maintenance. Option 4 provides the service technician, the ability to remove the media items traded-in and as part of this process, a listing of all the media is printed out for shipping with the media items, as well as being electronically sent to the inventory database. The technician can also alert the system if a media item is missing from either the traded-in media items or from the list. Option 5 is the service printer option for the service technician which allows access and information regarding which of the various printers need replacement of paper, gift cards, ink or needs other types of service. Option 6 allows the service technician to service the gift card sections of the kiosk, including, but not limited to, replacing expired versions of gift cards (such as holiday special editions), removing vendor gift cards for those no longer partnering with the kiosk system, and inserting new vendor gift cards. Finally, option 7, allows the service technician in limited circumstances to remove or insert cash into the kiosk, or perform a check of the cash balance of the kiosk.

The service menu 340 will not always be visible on the kiosk interface 302, or in alternative embodiments, would be subject to a username and password or other security measures to ensure that a user could not cause undesired changes to be made. These requirements would allow access to the kiosk to be limited and monitored. Additionally, the above actions can also trigger log files to be generated in the respective database or locally in the kiosk memory. It should be noted that each of these options and the examples provided should not be considered limited to only those examples provided.

One menu that for many users will be the most critical is the live interface portal 350. The live interface portal 350 allows a user to request live support via the live support options 351. Among the live support options 351 are online chat, video chat, and voice chat. The online chat option (option 1) allows the user to interact with live support utilizing the kiosk display and kiosk input device(s). For video and voice chat, a user can utilize the kiosk display and the kiosk camera and microphone to connect with live support through the kiosk interface 302.

There is also the firmware menu 360 that allows a service technician to perform several services. These services include from the firmware options menu 361: current firmware (option 1), check for firmware update (option 2), update firmware (option 3), and revert firmware (option 4). Under option 1, current firmware, the service technician can check the current version of the firmware prior to performing any services to the kiosk system. For option 2 the technician can initiate a check for the latest firmware without initializing an update. This option is very useful in an environment where updates can happen almost daily. Some updates will not be required at specific locations while in other locations, daily updates are absolutely necessary. Under option 3 the technician can initiate a firmware update if one is available without waiting for a status check. In an exemplary embodiment there would also be a submenu that would allow the technician to lockout the kiosk until firmware update is complete. A dedicated lockout screen can be utilized to show that the kiosk is running an operation and is useable. Additionally, there can be an option to have the kiosk appear shutdown. Alternatively, either of the two previous options can be utilized with an automatic power down at the conclusion of the firmware update. If the power down option was chosen then the Network Operation Center can remotely power up the kiosk or it could be initiated upon the next opening of the retail location where the kiosk is located. Finally, there is option 4 which would allow the technician to revert the kiosk firmware to a previous version in the event that an undiscovered bug in the latest firmware comes to light after its installation. It should be understood that these options and services could also be performed remotely through either the management server, network operation center or the computer network.

Figure 4:
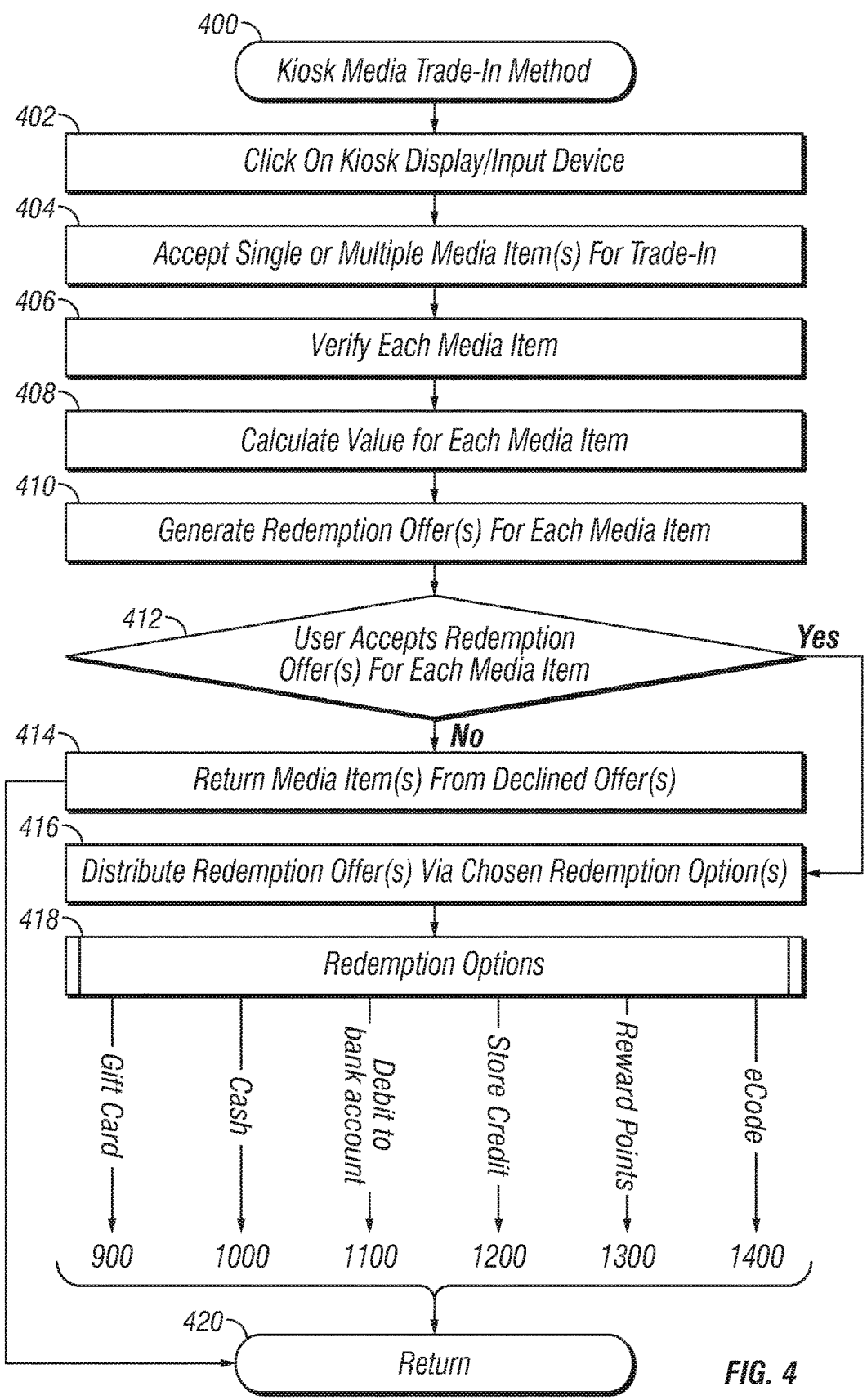
FIG. 4 illustrates the kiosk media trade-in method.

The kiosk media trade-in method 400 is illustrated in FIG. 4. A user initiates the media trade-in method 400 by clicking on the kiosk display or kiosk user input device in step 402 that also triggers the kiosk interface. Once the kiosk interface is active, the user can insert media item(s) into the kiosk, which are then accepted by the kiosk in step 404 for trade-in by the media acceptance subsystem 232. The kiosk can accept single or multiple media items for trade-in via the acceptance step 404. Once the media has been accepted in step 404, each media item(s) must then be verified for authenticity and viability in step 406. The verification process of step 406 includes, but is not limited to, verifying media items such as optical discs or cartridges for pinholes or voids, and checking for studio applied security measures. The verification process of step 406, also includes verifying the media item(s) authenticity via the title, genre, or system type (DVD, CD, video game system, etc.). If the media item passes the verification process in step 406, the value of each media item is calculated through a valuation algorithm process that is activated by the exchange subsystem process 600 in step 408. After the media item exchange value is calculated in step 408, the redemption offers for each media item can be generated by the valuation algorithm process and the exchange subsystem process 600 in step 410. The generated redemption offers are then provided to the user via the kiosk interface, and the user chooses to either accept or decline the proposed offers in step 412. If a user declines the redemption offer for a media item, the media item is then returned to the user in step 414. Step 414 can be repeated for each media item that is declined. Alternatively, if the user accepts, the distribution of the redemption offer(s) is initiated in step 416. The user can select or modify their chosen redemption option in step 418 when all the available options and additional choices for the specific kiosk are provided to the user. The available redemption options are gift cards 900, cash 1000, debit to bank account 1100, store credit 1200, reward points 1300, and eCodes 1400. The process for redeeming each of these rewards will be discussed in their own corresponding figures. After the completion of the redemption process in step 418 the user may return to the beginning of the process to trade-in additional media items or may close their transaction and allow the kiosk to return to a waiting state in step 420.

Figure 5:
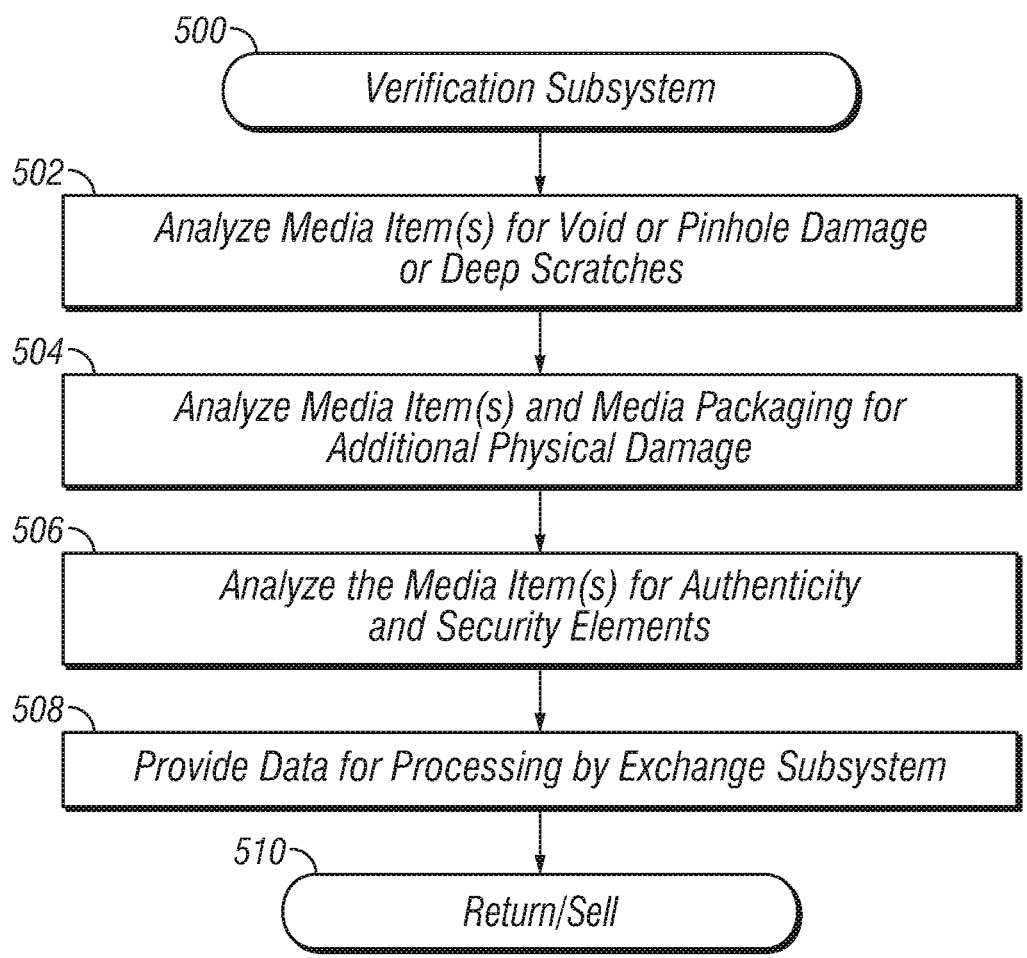
FIG. 5 shows the verification subsystem process.

FIG. 5 shows the verification subsystem process 500. After the kiosk has accepted the media item(s) from the user, each of the media item(s) must be verified for viability and authenticity. Each of the media item(s) are analyzed for voids or pinhole damage in step 502. This analysis is accomplished through known methods such as optical light analysis to determine if there are any voids or pinholes in the face of the optical disc. For other forms of media items, a similar void and pinhole verification can be performed to ensure that the media items, such as game cartridges, do not have voids or pinholes in the contact surfaces that would cause them to become unusable or unreadable. Step 502, the media items) are also analyzed for deep scratches through optical, camera, and laser methods. If the media item(s) fail the analysis of step 502, or any of the following viability or authenticity steps 504, and 506, the media item is then returned to the user with an error message alerting them that their media is not exchangeable or not acceptable for trade-in.

In step 504 the media item(s), packaging, and documentation are analyzed for physical damage. The kiosk system can ask or request a user to provide the packaging, instruction, or box for the media items as part of the trade-in process. This step 504 is achieved through the use of imaging and other light emitting systems that will allow the system to verify any potential physical damage that would render the media item(s), the media item packaging, or documentation unusable and thus untradeable. Damage that would render the media item(s), packaging, and documentation unusable is damage such as marring, holes, missing pages, cuts, and scratches. Additionally, false or non-studio provided documentation or packaging would also render the media item untradeable. While in some cases, scratches are okay for certain media item(s) if they do not result in a significant loss of data or readability.

Step 506 is the analysis of the media item(s) for their authenticity, and analysis for studio assigned security measures. Portions of the authenticity analysis include looking at the size of the data files, verifying the length of media files on the media item, and checking for other anti-theft notices. The security device check includes analysis of the media item for the security stamps, studio hidden data files, and security data contacts or rings. Furthermore, in step 506, the analysis includes checking manufacturing data, production date, replication date, and the replication status (original or copy).

At the conclusion of the analysis steps, the authenticity data and physical damage data is sent for processing by the exchange subsystem process 600 in step 508. The verification subsystem process 500 either returns to step 502 for additional media item(s) or continues with the trade-in process by moving on to processing by the exchange subsystem process 600.

Figure 6:
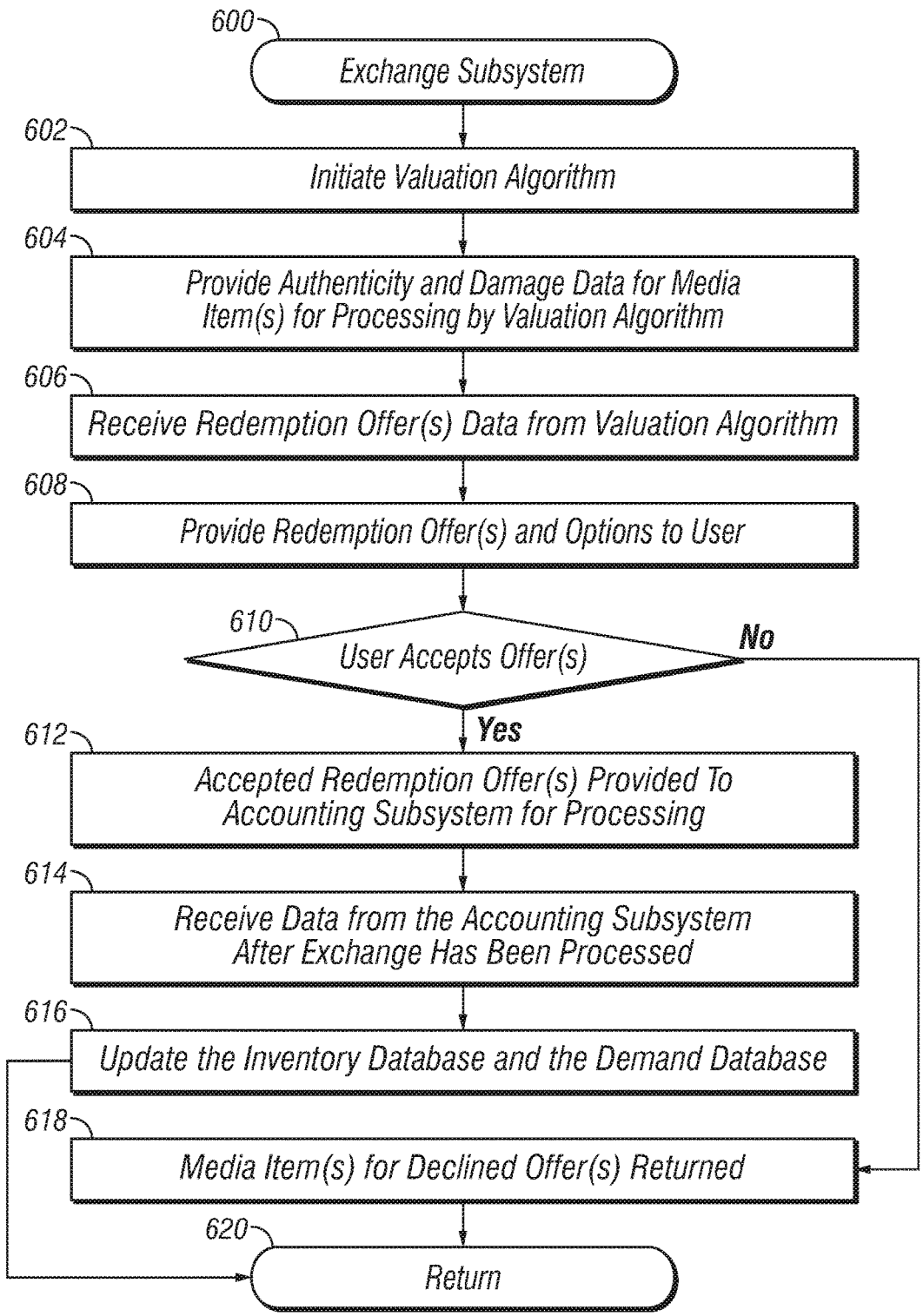
FIG. 6 shows the exchange subsystem process.
Figure 7:
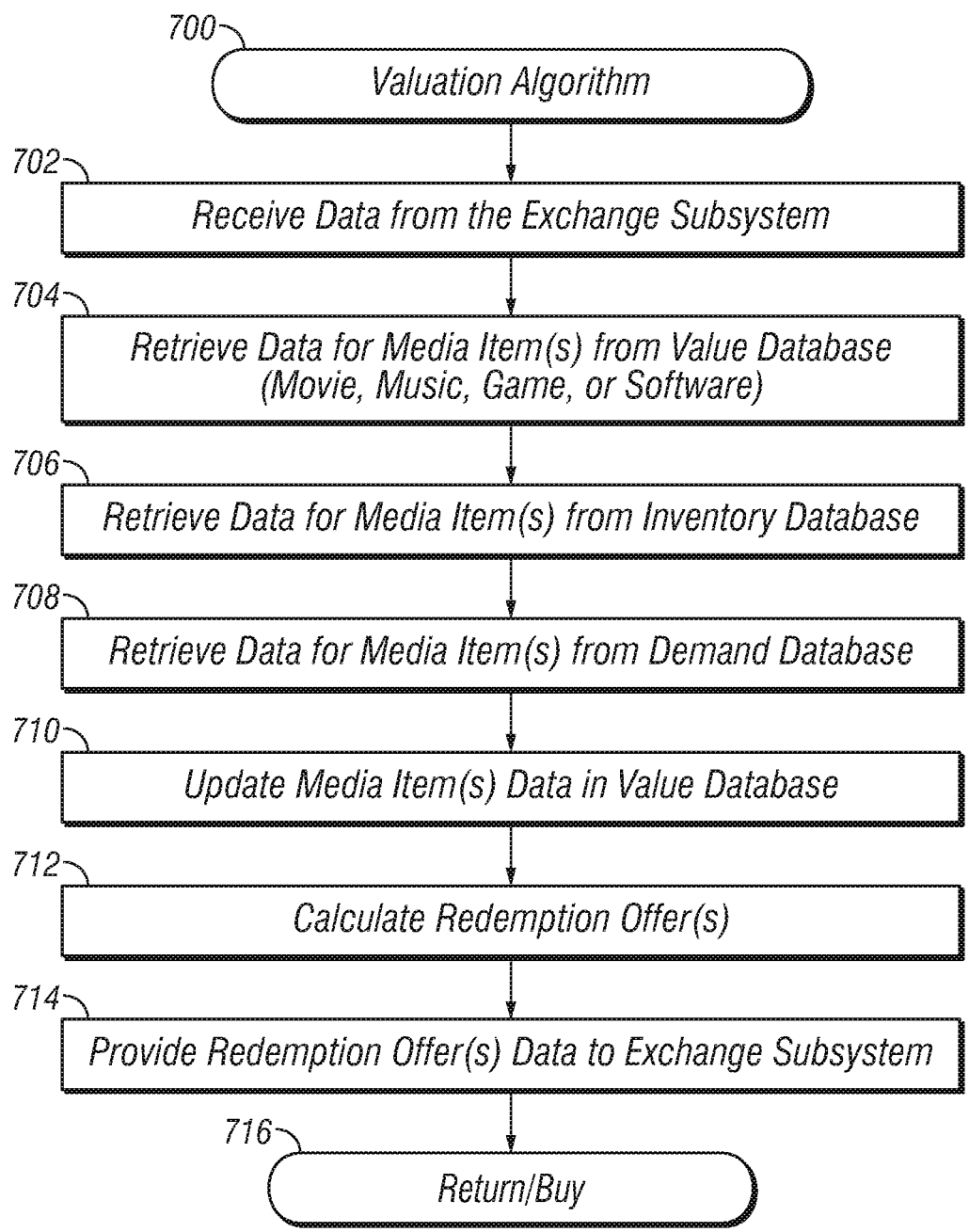
FIG. 7 illustrates the valuation algorithm process.

FIG. 6 illustrates the exchange subsystem process 600. The exchange subsystem process 600 receives data from the verification subsystem process 500 that is used to determine the exchange value of the media item(s). In step 602, the valuation algorithm process 700, which will be discussed in relation to FIG. 7, is initiated via the exchange subsystem process. The authenticity data and physical damage data from the verification subsystem process 500 is provided to the valuation algorithm process 700 in step 604. Once the valuation algorithm process has calculated the exchange value, and determined the available redemption offer(s), the redemption offer(s) are received by the exchange subsystem process in step 606. The redemption offer(s) and options are determined, via the exchange subsystem process, and provided to the user via the kiosk display in step 608. In step 610, the user chooses to accept or decline the redemption offer(s) provided by the valuation algorithm process and exchange subsystem process. It can be understood that the redemption offer(s) and options can be presented in a number of presentations. For example, a minimum and maximum offer could be displayed with the individual options presented in a later step. If the user accepts one or more of the offer(s) in step 610, the accepted redemption offer(s) are provided in step 612 to the accounting subsystem process for processing, discussed further in regards to FIG. 8. After the redemption offer(s) have been processed, the exchange subsystem process provides for receiving data from the accounting subsystem process in step 614. The data received in step 614 is then used to update the inventory and demand databases in step 616. If a user has declined a redemption offer(s), the media item(s) for the declined offer(s) are returned to the user in step 618. After both steps 616 and 618 the user can return to the main kiosk interface or continue with additional trade-ins via the exchange subsystem process in step 620.

In an exemplary embodiment, the data received via the exchange subsystem process in step 614 can also include the ability of the kiosk system to prepare the media item and its associated packaging and documentation for shipping to the proper location based on the inventory and demand databases. This includes preparing and creating a shipping manifest and labels for return of the media items to the centralized distribution or refurbishment center. The labels can include, but are not limited to, shipping labels, REED tags, barcodes and other manners of visual identification. The refurbishing center will polish, repair and repackage the media items for resale at a corresponding location. The labels are assigned to the respective media items by the exchange subsystem that records them within the central database or inventory database for tracking of the media item to the refurbishing center. Additionally, in some instances this preparation would include relabeling the media item for resale at the physical location of the kiosk system, such as relabeling and preparing labels for the corresponding packaging. Because the kiosk system would be able to transfer the media item to the optimum location for the resale, the kiosk can provide optimum exchange value to the user.

The valuation algorithm process 700 is shown in FIG. 7. The valuation algorithm process receives data via the exchange subsystem process in step 702. This data includes the authenticity and physical damage data as provided by the verification subsystem process. After the data is received in step 702, the valuation algorithm process retrieves data from the value database for the respective media item(s) in step 704. The valuation algorithm process 700 also retrieves data regarding the media item(s) from the inventory database in step 706, and demand database in step 708. Using the data received in steps 702, 704, 706 and 708, the valuation algorithm process then updates the value database data for the media item(s) in step 710. Certain embodiments could have the inventory and demand databased synchronized with retailer and vendor inventory and demand databases. In step 712, the redemption offer(s) are calculated for each of the media item(s) provided by the user. Factors that are used in making the redemption offer(s) include the inventory on hand of the media item(s), the demand numbers for the media item(s), and the previously known values for media item(s) of like kind and quality. Once the redemption offer(s) are calculated, the redemption offer(s) are then provided to the exchange subsystem process in step 714. At the conclusion of the valuation algorithm process 700, the process returns via step 716 to step 702 if operating in sequential order or returns to the exchange subsystem process if performing the calculations of each media item in parallel which allows the trade-in process to continue and the kiosk can buy the media from the user.

Figure 8:
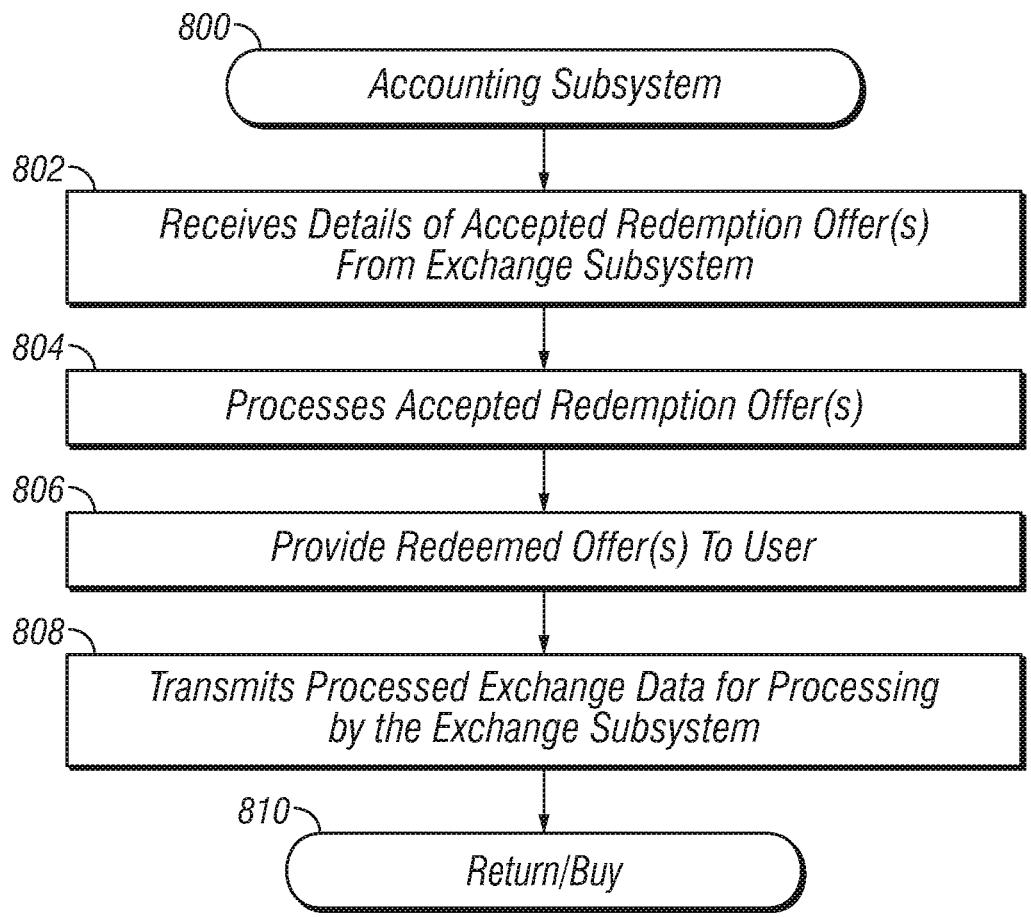
FIG. 8 shows the accounting subsystem process.

FIG. 8 illustrates the accounting subsystem process 800. The accounting subsystem 800 operates in coordination with exchange subsystem process 600, in step 802, the accounting subsystem process receives the details and data for the user accepted redemption offer(s) from the exchange subsystem process. Once redemption offer(s) are available, the user can then select the redemption option they wish to receive based on the redemption offer(s). It can be understood that a user could also select their redemption option at the same time as accepting the redemption offer(s). After the accounting system knows the redemption offer(s) accepted and the redemption option chosen, the trade-in can be processed in step 804. In step 806, once the processing step 804 is completed, the redeemed exchange offer is provided to the user. This can include the printing of a gift card for a specific vendor, printing an eCode or voucher, or providing a receipt indicating the amount has been transferred to a bank account or provided in cash. Data from the processed trade-in is then provided back to the exchange subsystem step 808 to update the inventory and demand databases. The accounting subsystem process 800 then, via step 810, either processes an additional trade-in or returns to the exchange subsystem process 600 for continuation of the trade-in process and the kiosk can buy the media from the user.

Figure 9:
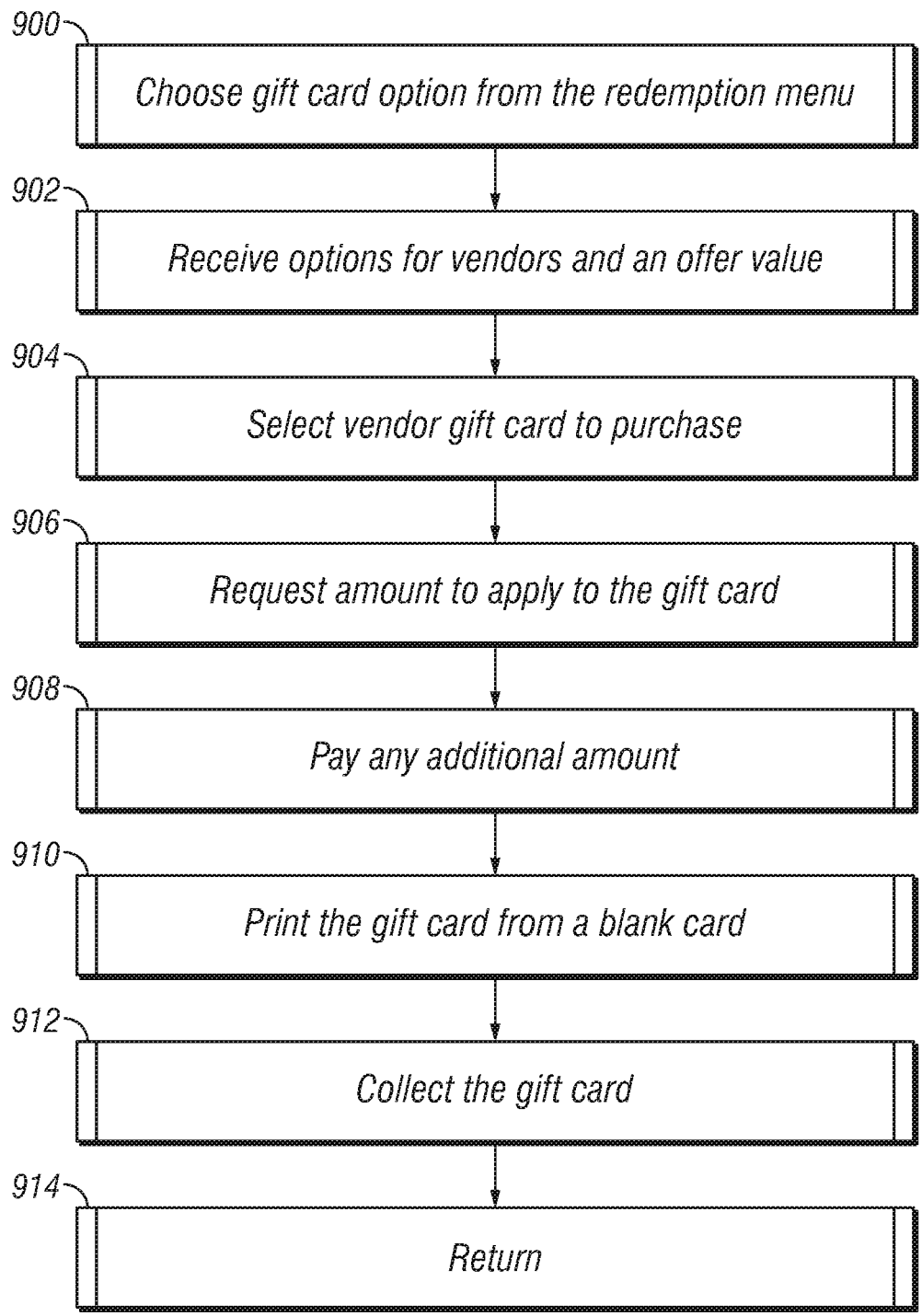
FIG. 9 illustrates the gift card redemption process.

FIGS. 9-14 illustrate exemplary embodiment of the redemption option processes, as it relates to a trade-in for cash, debit, gift card, reward, eCode, and store credit. FIG. 9 shows a trade-in based on the gift card option from the redemption menu 900. After the user has selected the gift card option from the redemption menu in step 900, in step 902, the user is presented with a choice of vendor gift card along with the redemption offer value for each gift card. The reason for also providing the redemption offer value is that some vendors use gift cards that are based on points rather than on dollar amounts, thus an exchange rate must be developed. In step 904, the user selects the vendor card to purchase or applies the redemption offer towards their gift card. The user can specify in step 906 if they would like to only apply a portion of the redemption offer or place an amount in excess of the redemption offer on the gift card. If the amount placed on the gilt card is in excess of the redemption offer then, in step 908, the user will be required to pay the difference via cash, a credit card, or a debit card. Once the payment is processed, in step 910, the gift card can be printed from a supply of blank cards or applied to a preprinted card. After the gift card is printed and processed, in step 912, the user can collect the gift card via a collection slot on the kiosk. Step 914, then returns the user to the redemption option menu if there are any residual amounts of the redemption offer available or additional media items to be traded-in.

Figures 10, 11:
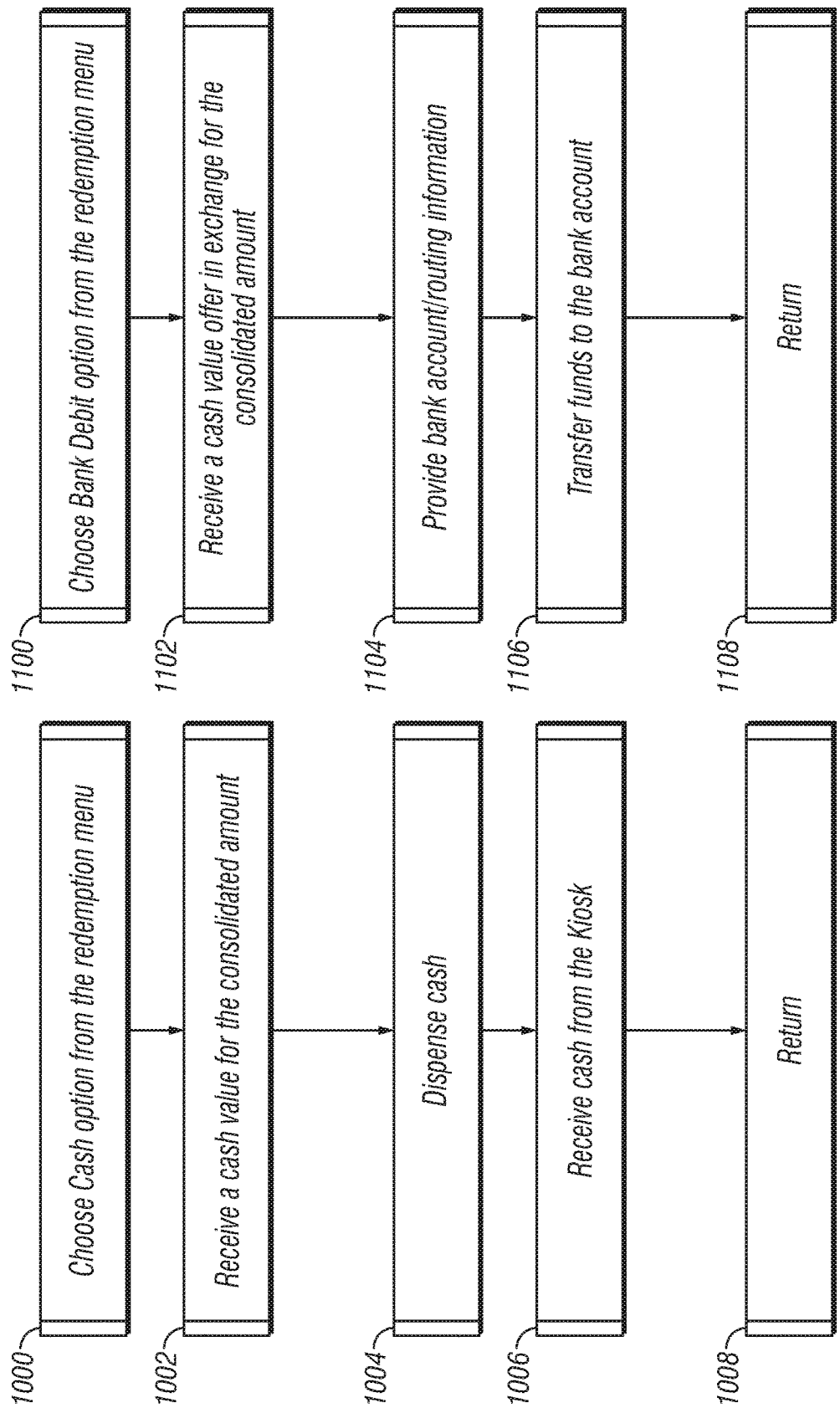
FIG. 10 illustrates the cash redemption process.
FIG. 11 illustrates the bank debit redemption process.

FIG. 10 is an illustration of a cash exchange. In step 1000, the user selects the cash option from the redemption menu. The user is provided the amount of the cash offer in step 1002, in some instances this will include a consolidated offer of several media item(s). The cash is then dispensed to the user in step 1004 via a cash slot on the front of the kiosk unit. After the cash is dispensed, the user receives the cash in step 1006. Step 1008, then returns the user to the redemption option menu if there are any residual amounts of the redemption offer available or additional media items to be traded-in.

An illustrative example of a bank debit exchange is seen in FIG. 11. In step 1100, the user selects the bank debit option for the redemption menu. The user receives the cash value of the offer in step 1102, in some instances this will include a consolidated offer of several media item(s). In step 1104, the user is required to provide their bank account and routing information in order to allow the system to transfer the funds. After the user has provided the required banking information, the transfer is initiated in step 1006. Step 1108 then returns the user to redemption option menu if there are any residual amounts of the redemption offer available or additional media items to be traded-in.

Figure 12:
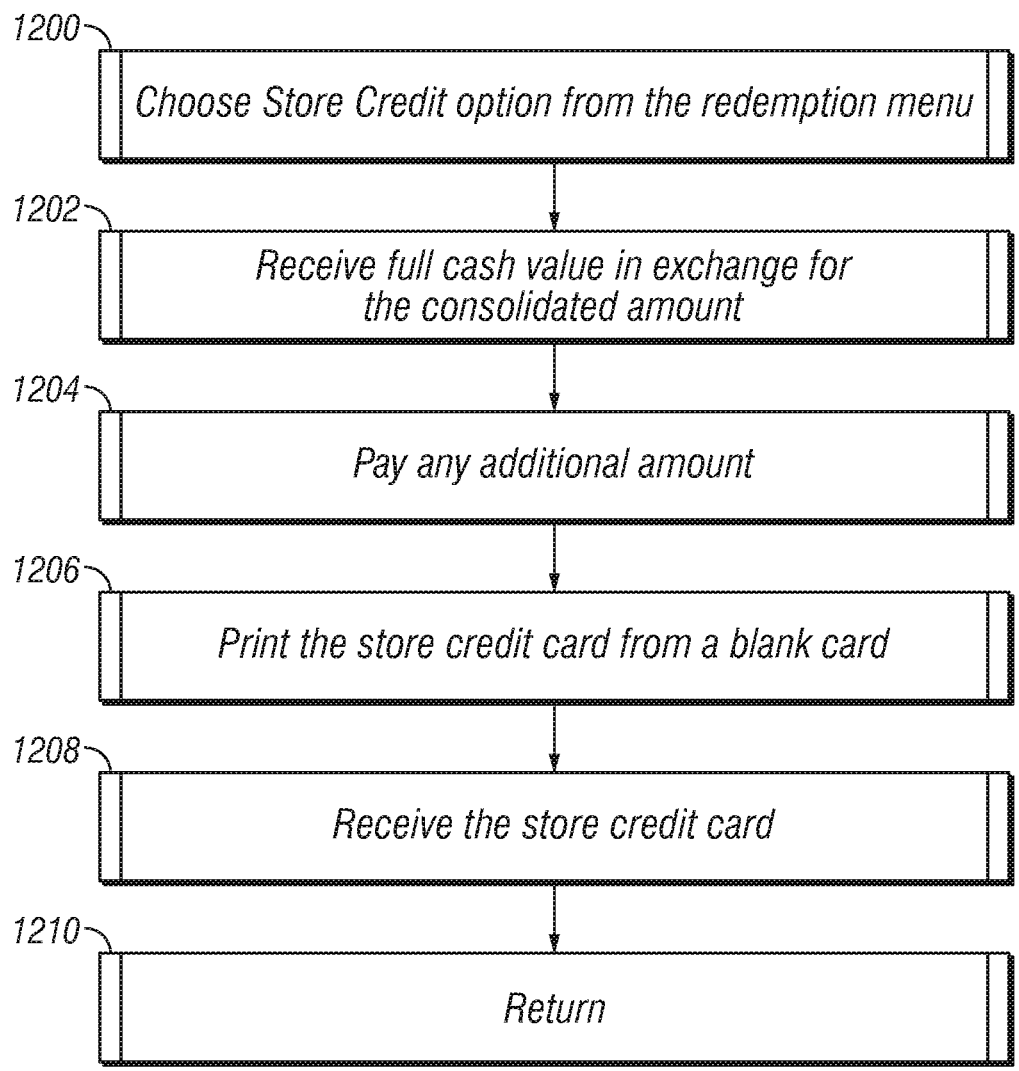
FIG. 12 illustrates the store credit redemption process.

FIG. 12 provides an illustration of the store credit option. When the user selects the store credit option from the redemption menu in step 1200, they are then provided with the redemption offer in step 1202. Additionally, in step 1202, the user may be provided with a choice for accepting the full cash offer for the consolidated set of media item(s) or may also be provided a bonus on top of the full cash offer as an incentive to use the store credit option. As with the gift card option, the user can also add and pay for additional amounts of store credit above the redemption offer in step 1204. After processing, the store credit is printed on a blank card from a supply of blank cards or applied to a preprinted card during step 1206. After the store credit is printed on a card and processed, the user, in step 1208, can collect their card via a collection slot on the kiosk. Step 1210 then returns the user to the redemption option menu if there are any residual amounts of the redemption offer available or additional media items to be traded-in.

In FIG. 13, an exemplary embodiment of the reward points option is shown. In step 1300, the user chooses the reward points option from the redemption menu. The user, in step 1304, then confirms the redemption offer(s) for the reward points. After the redemption offer is confirmed, the user is required to provide their reward points account and merchant information in step 1306. After the reward points account information is confirmed, the reward points are transferred in step 1308. Step 1310 then returns the user to the redemption option menu if there are any residual amounts of the redemption offer available or additional media items to be traded-in.

The eCode option is illustrated in FIG. 14. A user chooses the eCode option from the redemption menu in step 1400. The user receives the cash value of the redemption offer in step 1402, the redemption offer can also be comprised of the consolidated value of multiple media item(s). After receiving the redemption offer information, the user must select the means of transmission for the eCode in step 1404. The eCode can be transmitted through a number of means, such as a printed receipt, email, text message, Bluetooth, or Near-Field-Communication (NFC) system used with mobile payment devices. In step 1406, the cash value of the redemption offer is then transmitted via the means selected by the user. Step 1408 then returns the user to the redemption option menu if there are any residual amounts of the redemption offer available or additional media items to be traded-in.

Figure 15:
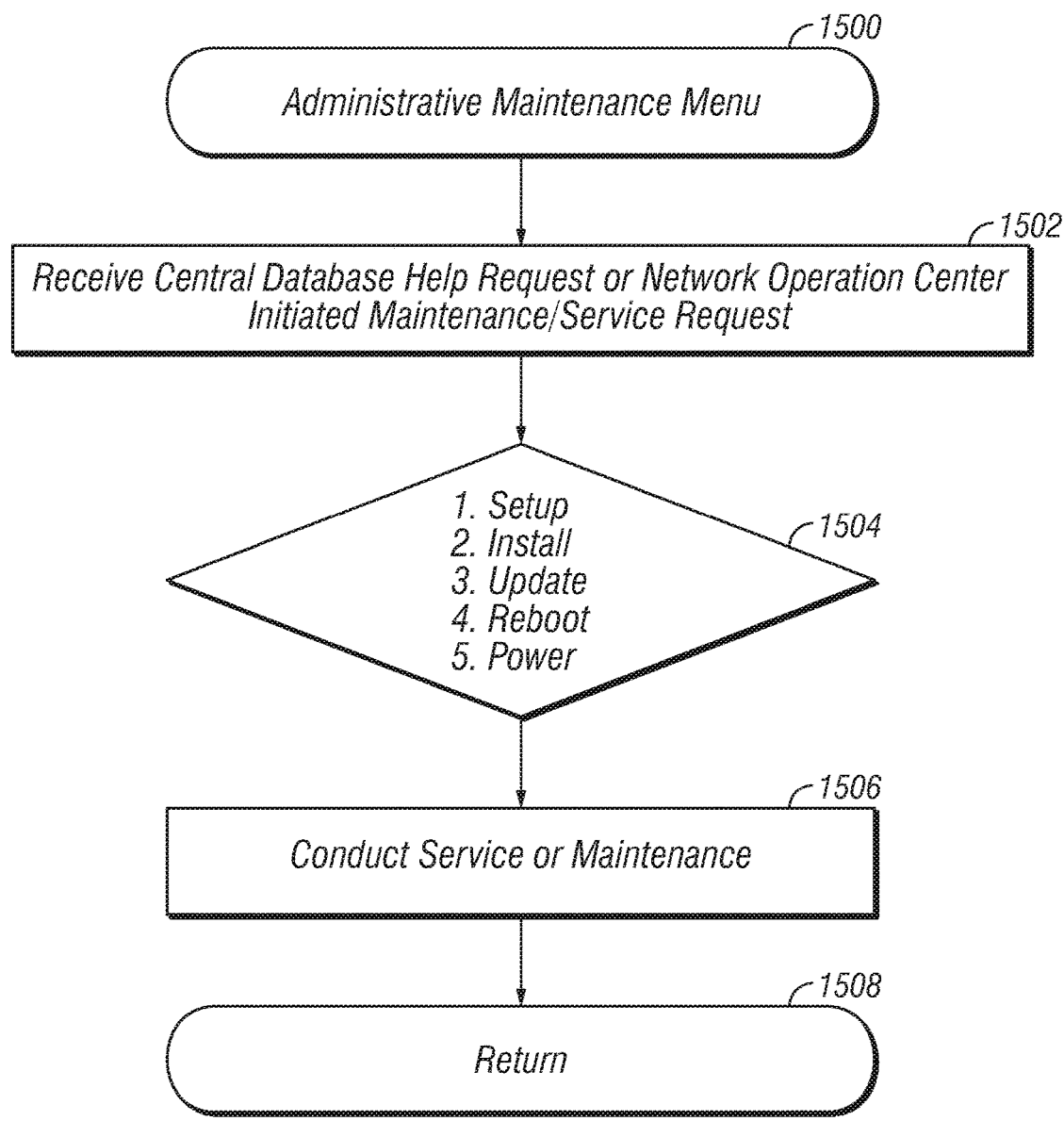
FIG. 15 illustrates the administrative maintenance process.

FIG. 15 illustrates the administrative maintenance menu 1500. The administrative maintenance menu 1500 allows the Network Operation Center to receive service requests from individual kiosks or initiate maintenance or service to all or a select number of the kiosk units in step 1502. Step 1504 provides the options for some of the various maintenance tasks that can be performed such as setup (option 1), install (option 2), update (option 3), reboot (option 4), and power (option 5). The setup option (option 1) allows the administrator to make adjustments such as modify the exchange rate for the local rewards program, the store, or retail location gift card bonus amount. Other setup options may include adjusting the menu configurations or other available options within the other menus such as adding into the exchange menu, additional exchange menu options. The administrator can also perform installations (option 2), updates (options 3), and reboots (option 4) to the kiosk interface. Installations and updates to the existing kiosk interface can include updates to firmware, software, and the installation of additional executable files. All of these operations are operations that affect the databases, including the central database, which is why they are performed by the network operation center and not at the kiosk level, though in alternative embodiments of the present invention, these operations may be performed at the kiosk level. Options 4 reboot and 5 power allow the administrator to perform power operations to the kiosk unit such as shutting it down, setting a timed power down, pre-setting future shut down, and performing a power cycle to reset the overall system, however, it is not limited to these operations. In step 1506, the maintenance and service operations are then performed and allow the entire system to operate normally in the return step 1508.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Field of the Disclosure," the claims should not be limited by the language chosen under this heading to describe the so-called field. Further, a description of a technology as background information is not to be construed as an admission that certain technology is prior art to any embodiment(s) in this disclosure. Neither is the "Brief Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

I claim:
1. A kiosk system comprising:
   a user interface having a display and a camera, wherein the display and the camera allow a user to interact with live support;

a media acceptance subsystem that receives a media item;

a verification subsystem to ensure viability of the media item, wherein the verification subsystem analyzes the media item for data file authenticity, the verification subsystem having at least one carousel that receives the media item from the media acceptance subsystem, wherein the carousel has at least one physical damage detection stage;

wherein the kiosk system is configured to execute an exchange subsystem process including a valuation algorithm, and wherein the kiosk system further comprises a card printer, the card printer allows printing from blank cards;

wherein the exchange subsystem process can initiate printing a gift card via the card printer for a retailer at the kiosk system location or another retailer at another location;

wherein the kiosk system is configured to execute an accounting subsystem process for ensuring exchange of the media item and producing an accepted redemption offer to the user; and at least one slot for accepting media packaging or documentation.

2. The kiosk system of claim 1, wherein the media acceptance subsystem further comprises a disc acceptance mechanism.

3. The kiosk system of claim 1, wherein the verification subsystem further comprises an optical imaging unit.

4. The kiosk system of claim 1, wherein the verification subsystem further comprises a laser gradient detection unit.

5. The kiosk system of claim 1, wherein the media acceptance subsystem further comprises:
an upper support;
a lower support; and
a transfer engager.

6. The kiosk system of claim 1, wherein the verification subsystem further comprises:
a transfer engager, wherein the carousel receives the media item from the transfer engager;
a motor;
a plurality of gears; wherein the motor and the plurality of gears rotationally move the carousel; and
said carousel having at least one storage stage.

7. The kiosk system of claim 1, wherein the verification subsystem further comprises:
a transfer engager, wherein the carousel receives the media item from the transfer engager;
a motor;
a plurality of belts; wherein the motor and the plurality of belts rotationally move the carousel; and
said carousel having at least one storage stage.

8. The kiosk system of claim 1, wherein the exchange subsystem process further comprises a media value database.

9. The kiosk system of claim 1, wherein the exchange subsystem process further comprises a customer database.

10. The kiosk system of claim 1, wherein the valuation algorithm further comprises a value status update based on inventory and demand.

11. The kiosk system of claim 1, wherein the producing the accepted redemption offer to the user further comprises distributing cash.

12. The kiosk system of claim 1, wherein the producing the accepted redemption offer to the user further comprises distributing an eCode.

13. The kiosk system of claim 1, wherein the producing the accepted redemption offer to the user further comprises distributing a gift card.

14. The kiosk system of claim 1, wherein the producing the accepted redemption offer to the user further comprises distributing a store credit.

15. The kiosk system of claim 1, wherein the producing the accepted redemption offer to the user further comprises distributing a reward points.

16. The kiosk system of claim 1, wherein the producing the accepted redemption offer to the user further comprises distributing a debit amount to the user's bank account.

17. The kiosk system of claim 12, wherein the eCode has added value if redeemed within a kiosk location.

18. The kiosk system of claim 13, wherein the gift card has added value if redeemed at a same physical location as the kiosk system.

19. The kiosk system of claim 1, wherein the exchange subsystem process further comprises a relabeling unit.

20. A method for media trade-in comprising steps:
(1) accepting a media item from a user, via a media acceptance subsystem, the media acceptance subsystem having a upper support, a lower support, and a transfer engager;
(2) verifying the media item with a verification subsystem, wherein the verification subsystem performs physical and digital authentication, and wherein the verification system has at least one carousel that receives the media item from the media acceptance subsystem;
(3) analyzing the media item for holographic security images;
(4) valuing the media item with a valuation algorithm;
(5) exchanging the media item for a value with an accounting subsystem process; and
(6) producing an accepted redemption offer, and if the accepted redemption offer is a gift card, utilizing a card printer to print said gift card.

21. The method for media trade-in of claim 20, wherein the accepting step (1) further comprises accepting a media disc from the user.

22. The method for media trade-in of claim 20, wherein the accepting step (1) further comprises accepting a media box or case from the user.

23. The method for media trade-in of claim 20, wherein the accepting step (1) further comprises accepting a media document from the user.

24. The method for media trade-in of claim 20, wherein the accepting step (1) further comprising steps:
moving the media item into a kiosk enclosure; and
transferring the media item to the at least one carousel.

25. The method for media trade-in of claim 20, wherein the verifying step (2) further comprises steps:
analyzing the media item for authenticity, wherein physical authenticity comprises optical scanning and laser gradient detection, and digital authentication comprises comparing a media item data file to the known file information;
analyzing the media item for voids; and
analyzing the media item for physical damage.

26. The method for media trade-in of claim 20, wherein the valuing step (4) further comprises steps:
determining a current inventory status of the media item;
determining a current demand status for the media item; and updating a value database with the value calculated based on the current inventory status and the current demand status.

27. The method for media trade-in of claim 20, wherein the valuation algorithm further comprises:
   calculating potential return on investment from the valuing step (4) of the media item;
   establishing the accepted redemption offer for the media item based on a value database with the value calculated based on a current inventory status and a current demand status; and
   determining a scaling value for the accepted redemption offer if redeemed at a specific retailer or vendor.

28. The method for media trade-in of claim 20, wherein the accounting subsystem process receives input from the user based on a selected redemption offer.

29. The method for media trade-in of claim 20, wherein the exchanging step (5) further comprises steps:
   processing the media item that is exchanged by the user;
   updating a value database.

30. The method for media trade-in of claim 20, wherein the producing step (6) further comprises:
   processing the accepted redemption offer selected by the user; and delivering a selected redemption offer to the user.

* * * * *